United States Patent
Shila et al.

(10) Patent No.: US 10,970,375 B2
(45) Date of Patent: Apr. 6, 2021

(54) PRIVACY PRESERVING BIOMETRIC SIGNATURE GENERATION

(71) Applicant: Unknot.id Inc., Winter Garden, FL (US)

(72) Inventors: Devu Manikantan Shila, Winter Garden, FL (US); Adriaan Joris H. Larmuseau, Zwevegem (BE)

(73) Assignee: Unknot.id Inc., Winter Garden, FL (US)

( * ) Notice: Subject to any disclaimer, the term of this patent is extended or adjusted under 35 U.S.C. 154(b) by 0 days.

(21) Appl. No.: 16/584,882

(22) Filed: Sep. 26, 2019

(65) Prior Publication Data

US 2020/0349245 A1 Nov. 5, 2020

Related U.S. Application Data

(60) Provisional application No. 62/843,369, filed on May 4, 2019.

(51) Int. Cl.
*G06F 21/32* (2013.01)
*G06K 9/00* (2006.01)
(Continued)

(52) U.S. Cl.
CPC .............. *G06F 21/32* (2013.01); *G06F 3/045* (2013.01); *G06K 9/0002* (2013.01);
(Continued)

(58) Field of Classification Search
USPC ........................................................ 713/186
See application file for complete search history.

(56) References Cited

U.S. PATENT DOCUMENTS

2015/0347734 A1* 12/2015 Beigi .................... H04L 9/3231
713/155
2018/0103030 A1* 4/2018 Einberg ................ H04W 12/06
(Continued)

OTHER PUBLICATIONS

Liu et al., "Robust Identity Verification Based on Human Acoustic Signature with BioHashing", Sep. 2014 IEEE (Year: 2014).*
(Continued)

*Primary Examiner* — Khalil Naghdali
(74) *Attorney, Agent, or Firm* — Cognition IP, P.C.; Edward Steakley

(57) ABSTRACT

Methods, systems, and devices are provided for generating biometric signatures. The system can detect, at an electronic device, one or more biometric acoustic signals. The system can generate a biometric signal input of the one or more biometric acoustic signals. The system can apply a machine learning model to conduct feature extraction of the biometric signal input having one or more biometric acoustic signals. The system can generate a biometric user signature of the user from the machine learning model. The system can perform one or more privacy preserving hashing functions to the biometric user signature to generate a hashed biometric user signature. The system can determine whether the hashed biometric user signature satisfies a predetermined threshold with an enrollment hashed signature of the user. And the system can authenticate an identity of the user upon detecting that the hashed biometric user signature satisfies the predetermined threshold.

27 Claims, 18 Drawing Sheets

(51) Int. Cl.
*G06F 3/045* (2006.01)
*G07C 9/25* (2020.01)
*G07C 9/26* (2020.01)

(52) U.S. Cl.
CPC ..... *G06K 9/00355* (2013.01); *G06K 9/00892* (2013.01); *G07C 9/257* (2020.01); *G07C 9/26* (2020.01)

(56) References Cited

U.S. PATENT DOCUMENTS

| | | | |
|---|---|---|---|
| 2019/0050618 A1* | 2/2019 | Khuri-Yakub | A61B 5/1172 |
| 2020/0036528 A1* | 1/2020 | Ortiz | G06N 3/08 |
| 2020/0050749 A1* | 2/2020 | Barboi | H04L 63/0861 |
| 2020/0052889 A1* | 2/2020 | Bendersky | H04L 9/0822 |

OTHER PUBLICATIONS

Garcia et al., "Authentication Gets Personal with Biometrics", IEEE Signal Processing Magazine, Mar. 2004, pp. 50-62 (Year: 2004).*
Campisi et al., "Authentication: Template Security Issues and Countermeasures", Biometrics: Theory, Methods, and Applications. Edited by Boulgouris, Plataniotis, and Micheli-Tzanakou Copyright© 2010 the Institute of Electrical and Electronics Engineers, Inc chapter 20 pp. 497-538 (Year: 2010).*

* cited by examiner

PRIVACY PRESERVING BIOMETRIC SIGNATURE GENERATION

CROSS-REFERENCE TO RELATED APPLICATION

This application claims the benefit of U.S. Provisional Application No. 62/843,369, filed on May 4, 2019, which is hereby incorporated by reference in its entirety.

BACKGROUND

With the increasing amount of daily online and mobile user activity, such as communicating via social media or conducting commercial transactions, the number of logins requiring access to sensitive personal information have also risen. As a result, verification methods have changed and improved over time to accommodate the amount of online activity that require logins or other verification techniques such that the process is accurate, safe, and convenient.

While passwords for log ins and verifications are still available as a method for authenticating a user, the process is slow and incentivizes users to either sacrifice convenience, such as the amount of time it takes to login to an account or verify a transaction such as an online purchase, or sacrifice security, by intentionally choosing weak passwords that are easier to login.

As a result, biometric sensing has been introduced as a verification technique to help online verifiers authenticate users. However, current biometric sensing data used to authenticate users engaging in online activity either lacks security, privacy, accuracy, or all of the above. The problem is especially apparent for smartphone users engaging in transactions every day that require sensitive personal for verifications.

A way to better improve the authentication of a person engaging in an organization's services would greatly streamline and improve the strength of digital activity among people in the world.

BRIEF SUMMARY

The present disclosure relates generally to systems and methods for biometric authentication. In one aspect, a biometric authentication system can be configured to generate a privacy preserving biometric user signature for authenticating the user identity. According to one aspect, the system can detect, at an electronic device, one or more biometric image signals of a user from an image sensing device. The system can detect, at the electronic device, one or more raw acoustic signals associated with the user from an acoustic sensing device. The system can identify one or more biometric acoustic signals derived from the one or more raw acoustic signals. The system can generate a biometric signal input of the one or more biometric acoustic signals and one or more biometric image signals. The system can apply a biometric signal input of the one or more biometric acoustic signals and one or more biometric image signals. The system can generate a biometric user signature of the user from the machine learning model. The system can perform a privacy preserving hashing function to the biometric user signature to generate a hashed biometric user signature. The system can determine whether the hashed biometric user signature satisfies a predetermined probabilistic threshold with an enrollment hashed signature of the user. And the system can authenticate an identity of the user upon detecting that the hashed biometric user signature satisfies the predetermined threshold.

In one aspect, the biometric image signals can include fingerprint pattern feature, facial features, iris features, or a combination thereof. The acoustic sensing device can be comprised of a first audio transducer, including one or more speakers, a second audio transducer, including one or more microphones, one or more motion sensors for sensing motion including a gyroscope, accelerometer, IMU, or a combination thereof. In one aspect, the first audio transducer can transmit ultrasonic audio signals in the frequency range of 11-24 kHz. And the second audio transducer can receive and capture ultrasonic audio signals at a sampling rate of 48 kHz.

In one aspect, the biometric acoustic signals can include breathing patterns, breathing rate, heart rate, respiratory patterns, chest movement, abdomen movement, chest expansion, body movement, facial movement, or a combination thereof. The biometric acoustic signals include hand motion patterns, hand vibration patterns, or a combination thereof.

In one aspect, the system can identify the one or more biometric acoustic signals by generating one or more sonar heat maps of the raw acoustic signals from one or more reflections of ultrasonic waves detected by the second audio transducer. In one aspect, the system can identify the one or more biometric acoustic signals by applying a noise filter circuit or noise filter algorithm.

In one aspect, the system can identify the one or more biometric acoustic signals by performing by a cross modal learning model configured to predict and determine whether the one or more raw acoustic signals detected by the electronic device are biometric acoustic signals. The system can generate a teacher network configured to receive biometric wearable signals. The system can generate a student network configured to receive the one or more sonar heat maps of the raw acoustic signals, motion patterns from the one or more motion sensors, or a combination thereof. The system can receive, at the student network, supervised training by the teacher network. And the system can predict, based on the one or more sonar heat maps and supervised training by the teacher network whether the one or more sonar heat maps of the raw acoustic signals are biometric acoustic signals. In one aspect, the biometric wearable signals can be generated by one or more sensing wearables having a respiration force sensor, a gyroscope, an accelerometer, or a combination thereof configured to detect raw wearable signals. In one aspect, each of the teacher network and student network are neural networks.

In one aspect, the biometric signal input can be a k×n matrix. The machine learning model can be a transfer learning model having pretrained training data associated with biometric acoustic training features and biometric image training features. In one aspect, the system can generate an m-dimensional feature vector comprising the one or more biometric acoustic signals from the input table. In one aspect, the system can generate a plurality of m-dimensional feature vectors wherein each of the plurality of m-dimensional feature vectors can be associated with a biometric acoustic signal of the one or more biometric acoustic signals. In one aspect, the m-dimensional feature vector can include a 128-2048 dimension embedding.

In one aspect, the hashing function can be a locality sensitive hashing function to generate locality sensitive hashes. The system can associate, when the threshold is satisfied, the hashed biometric user signature with a same bucket as that of the enrollment hashed signature, and when the threshold is not satisfied, the hashed biometric user signature with a different bucket as that of the enrollment hashed signature. In one aspect, the predetermined threshold can be 80%. In one aspect, the system can authenticate an identity of the user when detecting the hashed biometric user signature was placed in the same bucket as that of the enrollment hashed signature.

In one aspect, the image sensing device can include an iris scanner, a fingerprint scanner, a camera, a depth sensing camera, or a combination thereof. The electronic device can be a mobile device, laptop, desktop computer, wearable device, automobile, smoke detector, home security system, or an IoT smart assistant.

In one aspect, the chest movement can be detected by the user's breathing pattern, heartbeats, abdomen movements, vibrations in limbs, or a combination thereof. The detecting of the one or more biometric image signals and one or more raw acoustic signals can be activated in response to an authentication request by the user. In one aspect, the detecting of the one or more biometric image signals and one or more raw acoustic signals can be activated independently of the user's motion or request for authentication.

In one aspect, the system for generating an anonymized user signature can be configured to authenticate a user identity. According to one aspect, the system can detect, at the electronic device, one or more biometric acoustic signals. The system can generate a biometric signal input of the one or more biometric acoustic signals. The system can apply a machine learning model to conduct feature extraction of the biometric signal input having one or more biometric acoustic signals. The system can generate a biometric user signature of the user from the machine learning model. The system can perform one or more privacy preserving hashing functions to the biometric user signature to generate a hashed biometric user signature. The system can determine whether the hashed biometric user signature satisfies a predetermined threshold with an enrollment hashed signature of the user. And the system can authenticate an identity of the user upon detecting that the hashed biometric user signature satisfies the predetermined threshold.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described with reference to the following figures.

DETAILED DESCRIPTION

Figure 1A:
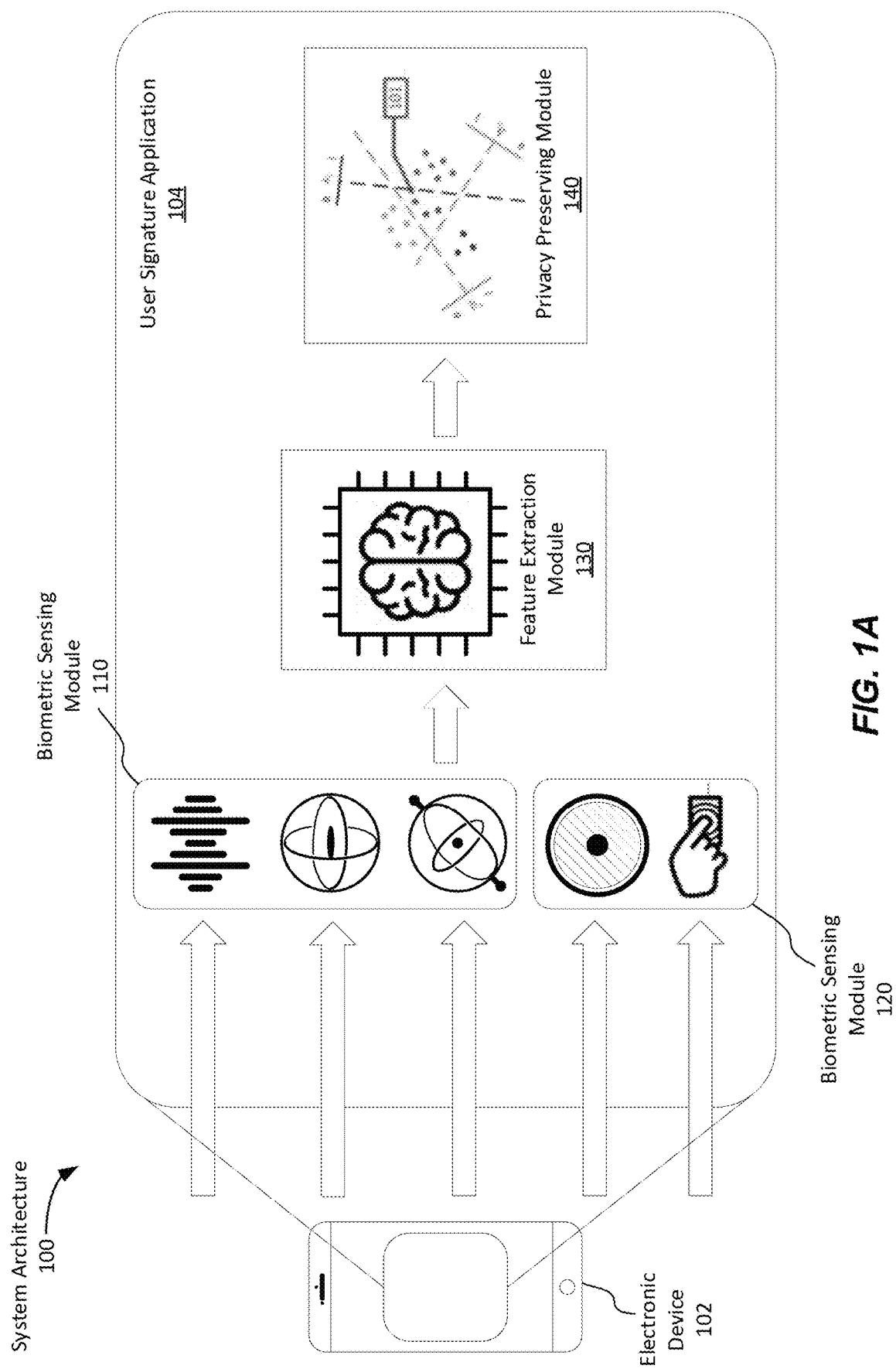
FIGS. 1A-C illustrate an environment of a computer system for generating biometric signatures in accordance with various aspects of the subject technology.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this patent can be performed in different orders than the order presented in this specification. Furthermore, some steps of the exemplary system and method may be performed in parallel rather than being performed sequentially.

A computer implemented system and method for generating privacy-preserving biometric signatures of users are discussed below.

The cost of cybercrime in the global economy is escalating and could reach 6 trillion dollars by 2021. The soaring cost is due in part to the ease of committing cybercrimes and rise and identity thefts which makes it difficult for organizations to protect their users with sensitive and critical information from hackers.

The following invention describes a biometric sensing system and method using augmented biometric sensing and learning to detect and generate a biometric signal specific to a user. The invention also describes a system and method configured to preserve the privacy of the user and the biometric signal related to the user such that verification of the user's identity can be performed using the biometric signal specific to the user while keeping specific details of the biometric signal itself anonymous from an organization requiring verification.

In one example, the biometric sensing and learning is performed by augmenting existing biometrics of a human, such as facial features, voice and fingerprint recognition with other human biosignatures, including heart rate variability, respiration patters, hand grip patterns, and other behaviors specific to each individual users such that sensing the specific behavior can create a unique biometric signature of the user. In one example, each of the biometrics sensed by sensing devices can be fused to create a single biometric user signature specific to a user having characteristics of each individual biometrics of a user discussed above. In one example, the biosignatures are sensed and detected by passive and noninvasive audio sensors in a computing device such as a mobile phone, or smartphone. The audio sensors emulate an active sonar system which can detect, acoustically, the individual biosignatures including heart rate, respiration patterns, and hand movements patterns.

In one example, since a user's facial features, fingerprints, voice, heart rate, breathing rate, and hand gesture and grip patterns are unique and considered sensitive information to a person, preserving the privacy of the user while using the biometric information to verify the user can greatly boost user confidence and trust in the verification system. In one example, the privacy of the user is preserved by performing privacy preserving hashing and cryptography to transform the generated biometric user signature carrying sensitive information to an anonymized user signature.

The user of privacy preserving hashing and cryptography, such as locality sensitive hashing and local differential privacy can ensure that the privacy of the individual is protected by perturbing and hashing her/his original biometric data locally on the sensing and verification device local to the user such that the identity requester or verifier cannot access the originally sensed biometric signals, but is still able to perform verification on anonymized data of users.

A. System Architecture for Verifying and Authentication a User

A system environment for generating biometric user signatures and privacy preserving biometric signatures is described below.

Figure 1B:
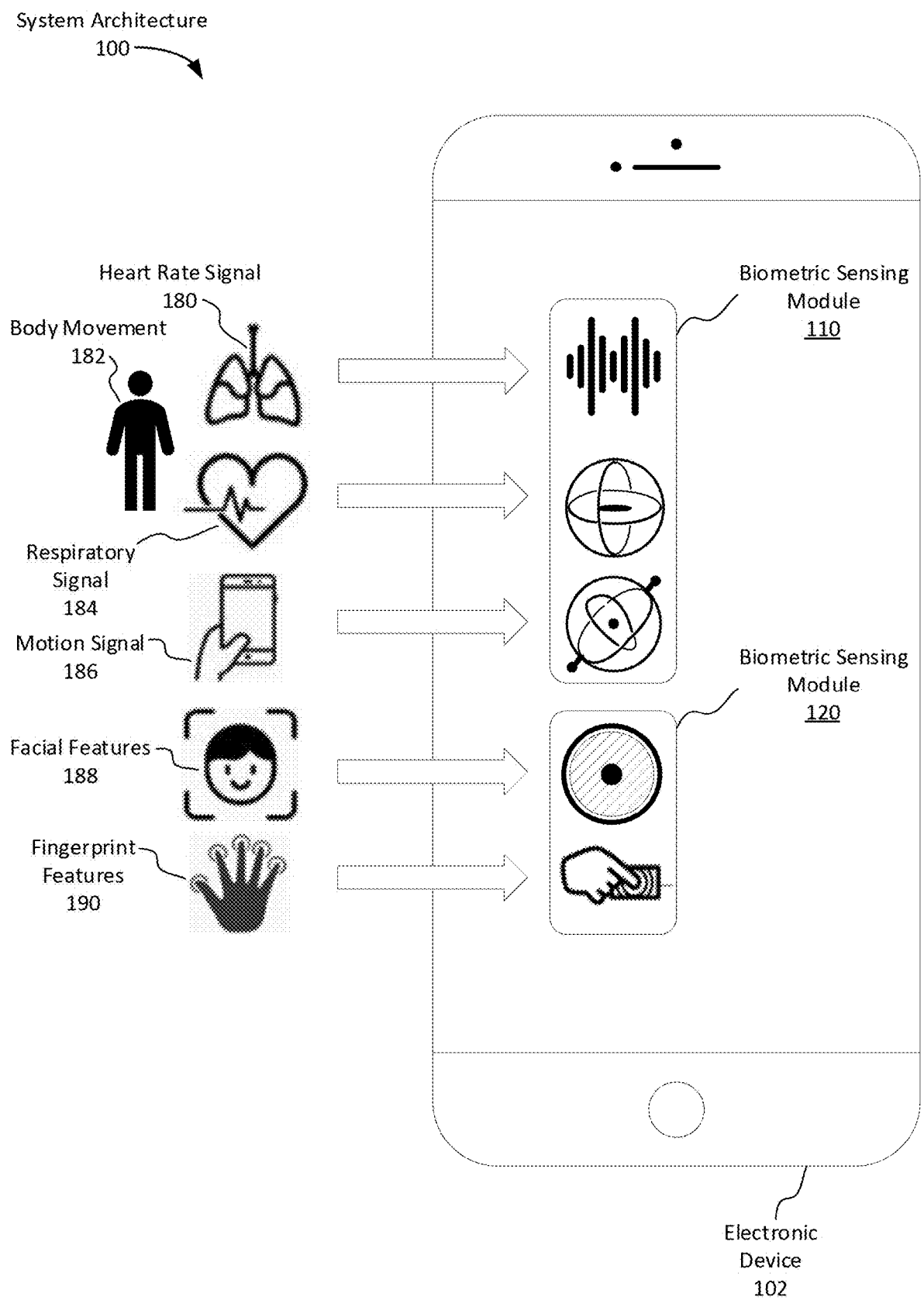
Figure 1C:
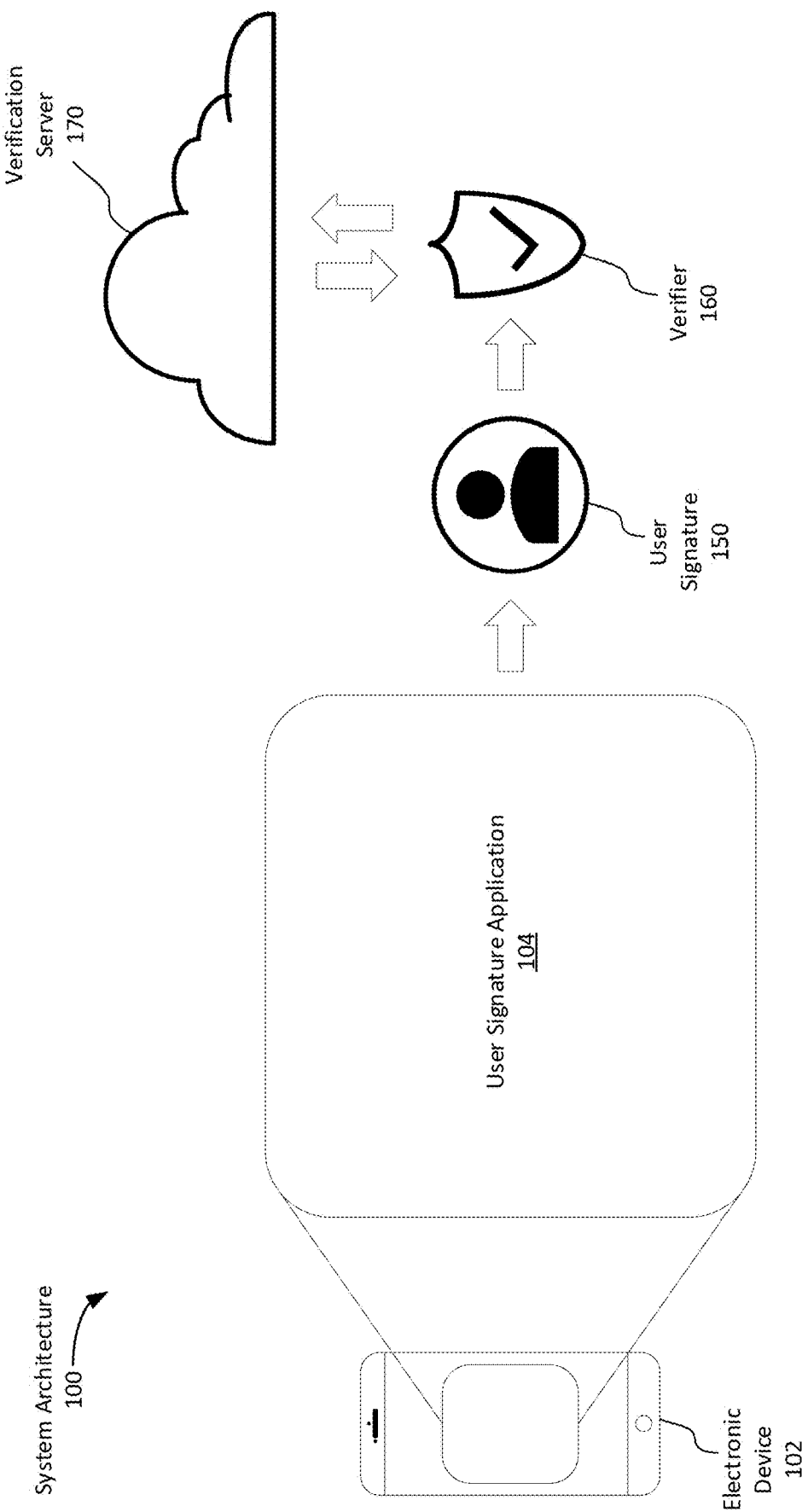

FIGS. 1A-C illustrates a system environment of a computer implemented system for verifying the identity of a user by generating a biometric user signature. As illustrated in FIG. 1, a system architecture 100 includes an electronic device 102 having a user signature application locally stored on to the electronic device 102. The electronic device 102, for illustrative purposes, can be a mobile phone or a smartphone. The electronic device 102 can also be an electronic smart assistant that can be configured to detect visuals or voice in its surroundings, laptop computers, wearables with biometric sensing devices, or internet of things ("IOT") devices that can be configured to receive and sense audio signals. In one example, the user signature application 104 can include a biometric sensing module 110 configured to sense and detect audio signals and motion of the electronic device 102 such as when a user is physically gripping the electronic device 102. The user signature application 104 can also include biometric sensing module 120 having sensing devices configured to sense and detect optical signals such as images. For example, biometric sensing module 120 can include a image capture device such as a camera or an optical sensing device such as a fingerprint reader. The biometric sensing module 110 can include acoustic sensing devices, motion sensing devices, or a combination thereof.

The biometric sensing module 110 and biometric sensing module 120 of the user signature application 104 is configured to received biometric sensing signals including biometric image signals and biometric acoustic signals from a user of the electronic device or a user near the electronic device 102.

As illustrated in FIG. 1B, biometric sensing module 110 can include acoustic sensing devices configured to detect and receive raw acoustic signals associated with the user or of a person physically near the biometric sensing module 110. In one example, the biometric sensing module 110 can include acoustic sensing devices such as a first audio transducer including one or more speakers and a second audio transducer including a one or more microphones. In this example, the speaker and microphone combination can simulate a sonar system to detect reflections of sound waves generated by the speaker. For example, even when the speaker is not actively emitting audible sound to a human, such as voice, notifications, or music, the speakers can emit high frequency audio signals. The audio waves are then reflected off a physical surface of the user such as the user's skin or limb, or surrounding environment of the user such a desk or table that the electronic device 102 was originally set. The reflected audio waves can then be sensed by the microphone. The transmission and collection of audio signals by the speaker and microphone can simulate a sonar heat map of the environment surrounding the electronic device 102 such as chest and lung movement patterns of the user holding the device, and movement of the electronic device itself such as the electronic device 102 being picked up for purposes of prompting biometric sensing for verification of a user. In one example, the biometric sensing module 110 can also include motion sensors for sensing motion of the electronic device 102 including a gyroscope, accelerometer, inertial measurement unit ("IMU"), or a combination thereof. The position of the phone detected by the motion sensors can be combined with the reflected audio signals transmitted and received by the speaker and microphone to better calculate and determine acoustic signals of the user. For example, the one or more first audio transducers can transmit ultrasonic audio signals in the frequency range of 11-24 kHz. The one or more second audio transducers can receive and capture ultrasonic audio signals at a sampling rate of 48 kHz. In this example, the raw acoustic signals received by the biometric sensing module 110 can be detected by an output audio signal via the one or more speakers and receiving an input audio signal based on a reflection of output audio signal on the user via the one or more microphones.

In one example, the raw acoustic signals captured by the audio transducers can be used to determine biometric acoustic signals of the user. For example, the biometric acoustic signals can include breathing patterns, breathing rate, heart rate signal 180, respiratory patterns, respiratory signal 184, chest movement, chest expansion, body movement 182, facial movement, or a combination thereof. The acoustic signals can also include motion signal 186 including hand motion patterns, hand vibration patterns, body movement 182, or a combination thereof. In this example, identifying the biometric acoustic signals can include generating one or more sonar heat maps of the raw acoustic signals from one or more reflections of ultrasonic waves detected by the microphone in the biometric sensing module 110. In another example, determining the biometric acoustic signals of the user from the raw acoustic signals captured by the audio transducers includes applying a noise filter algorithm or a noise filter circuit in the electronic device 102.

In one example, biometric sensing module 120 can include image sensing devices or optical sensing devices such as a camera for capturing facial features 188 and fingerprint reader for capturing fingerprint features 190 of a user. In one example, biometric sensing module 120 can also include acoustic sensing devices such as a microphone for sensing voice. The authentication system can perform voice recognition and processing.

The biometric image signals and biometric acoustic signals collected by the sensing modules are fused together at a feature extraction module 130 to generate a biometric signal input. In one example, the feature extraction module 130 can include a machine learning model, stored locally on the user signature application 104 of the electronic device 102, or a remote server, to conduct feature extractions of the biometric sensing signals detected and collected by the sensing modules. The feature extraction module 130 can then generate a biometric user signature of the user from the machine learning model. The biometric user signature can be a feature vector having the biometric acoustic signals from the sensing modules. The generated biometric user signature can be received by a privacy preserving module 140 of the user signature application 104. The privacy preserving module 140 can anonymize the biometric user signature by performing a hashing function to the feature vector to generate a hashed biometric user signature. In one example, the privacy preserving module 140 can determine whether the hashed biometric user signature is associated with the user. If the privacy preserving module 140 determines that the hashed biometric user signature is similar to that of a verified hashed signature that the user signature application has already determined to be authentic, such that the already verified hashed signature is associated with the user, then the user signature application 104 can determine that the currently received biometric user signature associated with the currently received biometric image signals and biometric acoustic signals and therefore authenticate the identity of the user based on the sensing signals received. If the similarities between the already verified hashed signature and the currently received hashed biometric user signature are not satisfied, then the user signature application 104 can reject the identity of the user.

In one example, if the hashed biometric user signature is determined to be authentic and associated with the user based on a previously verified user signature of the user, then the user signature application 104, at FIG. 1C, can send the hashed biometric user signature, or anonymized user signature 150 to a verifier 160 to verify the identity of the user such that the biometric image and acoustic signals sensed can act as a verification of identity of the user. For example, in response to a prompt to login to an online application or to verify a user before the user engages in an online transaction, a the user signature application 104 can sense and detect biometric image and acoustic signals from the user, determine that the biometric signals are associated with the user, and communicate with the verifier that the person attempting the login or confirming the transaction is the authenticated user.

Figure 2:
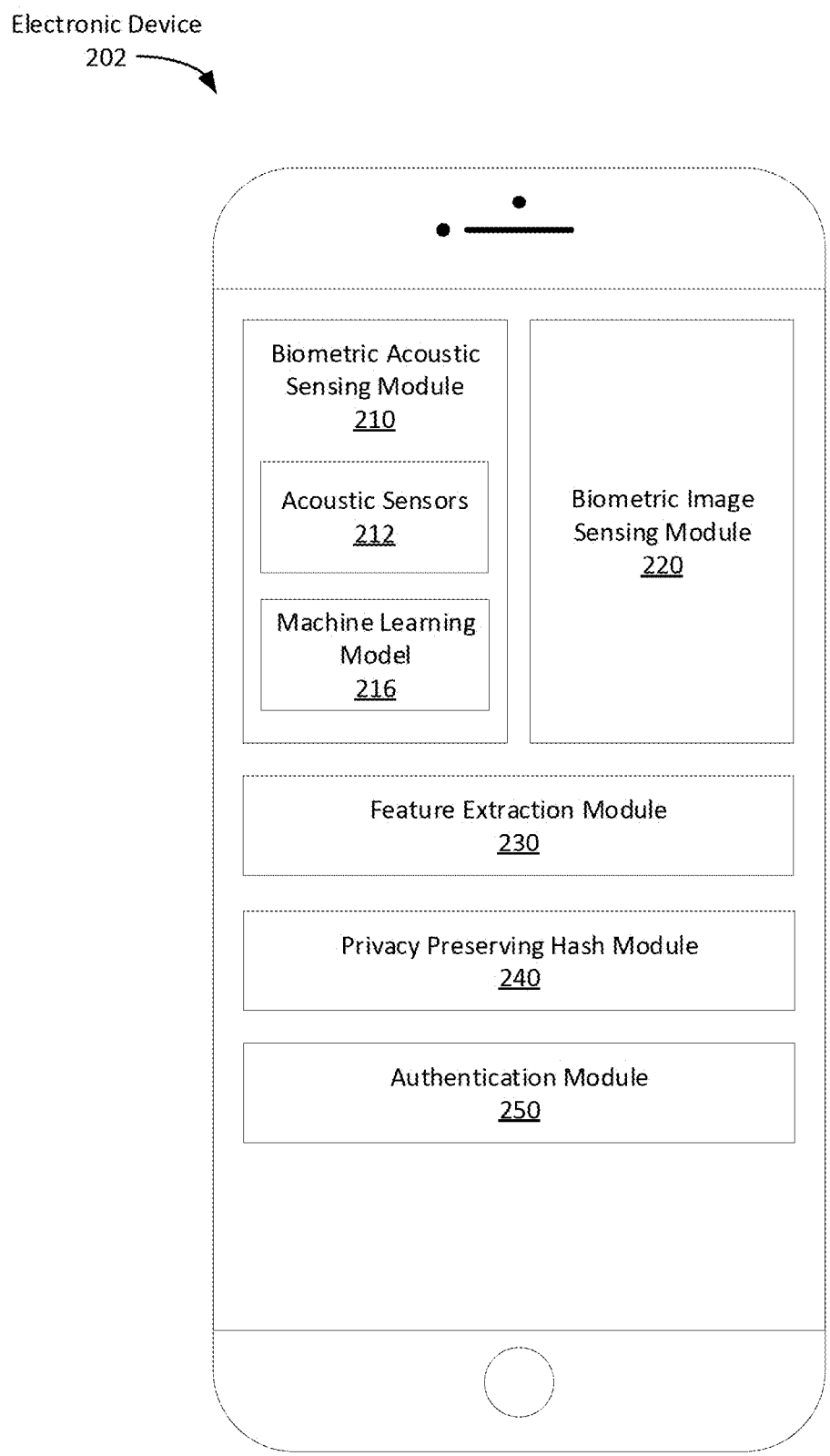
FIG. 2 shows an illustration of a computing device for generating biometric signatures in accordance with various aspects of the subject technology.

FIG. 2 illustrates an electronic device 202 having a plurality of applications, modules, and devices locally stored on to the electronic device 202 configured to perform functions related to authenticating an identity of a user via biometric signals similar to that of the system described in FIGS. 1A-C. As illustrated in FIG. 2, an electronic device 202 is configured to include a biometric sensing module 210 configured to sense and detect audio signals and motion of the electronic device 202 such as when a user is physically gripping the electronic device 202. The electronic device 202 can also include biometric acoustic sensing module 210 having sensing devices configured to sense and detect acoustic biometric signals from raw audio signals including acoustic sensors 212 and machine learning model 216. The acoustic sensors 212 can include acoustic sensing devices, motion sensing devices, or a combination thereof. The biometric image sensing module 220 is configured to capture image signals such as facial images having facial features and fingerprint signals. The biometric acoustic sensing module 210 and biometric image sensing module 220 are configured to received biometric sensing signals including biometric image signals and biometric acoustic signals from a user of the electronic device 202 or a user near the electronic device 202.

In one example, biometric acoustic sensing module 210 can include acoustic sensing devices such as acoustic sensors 212 configured to detect and receive raw acoustic signals associated with the user or of a person physically near the acoustic sensors 212. In one example, the biometric acoustic sensing module 210 can include acoustic sensing devices such as a first audio transducer including one or more speakers and a second audio transducer including a one or more microphones. In this example, the speaker and microphone combination can simulate a sonar system to detected reflections of sound waves generated by the speaker. For example, even when the speaker is not actively emitting audible sound to a human, such as voice, notifications, or music, the speakers can emit high frequency audio signals. The audio waves are then reflected off a physical surface of the user such as the user's skin or limb, or surrounding environment of the user such a desk or table that the electronic device 202 was originally set. The reflected audio waves can then be sensed by the microphone. The transmission and collection of audio signals by the speaker and microphone can simulate a sonar heat map of the environment surrounding the electronic device 202 such as chest and lung movement patterns of the user holding the device, and movement of the electronic device itself such as the electronic device 202 being picked up for purposes of prompting biometric sensing for verification of a user. In one example, the biometric acoustic sensing module 210 can also include motion sensors for sensing motion of the electronic device 202 including a gyroscope, accelerometer, inertial measurement unit ("IMU"), or a combination thereof. The position of the phone detected by the motion sensors can be combined with the reflected audio signals transmitted and received by the speaker and microphone to better calculate and determine acoustic signals of the user. For example, the one or more first audio transducers can transmit ultrasonic audio signals in the frequency range of 11-24 kHz. The one or more second audio transducers can receive and capture ultrasonic audio signals at a sampling rate of 48 kHz. In this example, the raw acoustic signals received by the biometric acoustic sensing module 210 can be detected by an output audio signal via the one or more speakers and receiving an input audio signal based on a reflection of output audio signal on the user via the one or more microphones.

In one example, the raw acoustic signals captured by the audio transducers can be used to determine biometric acoustic signals of the user. For example, the biometric acoustic signals can include breathing patterns, breathing rate, heart rate signal, respiratory patterns, respiratory signal, chest movement, chest expansion, body movement, facial movement, or a combination thereof. The acoustic signals can also include motion signal including hand motion patterns, hand vibration patterns, body movement, or a combination thereof. In this example, identifying the biometric acoustic signals can include generating one or more sonar heat maps of the raw acoustic signals from one or more reflections of ultrasonic waves detected by the microphone in the biometric acoustic sensing module 210. Further, the machine learning model 216 can receive the raw audio signals in the form of one or more sonar heat maps and identify one or more biometric acoustic signals from the raw acoustic signals. For example, a machine learning model 216 can include a cross modal learning model configured to predict and determine whether the one or more raw acoustic signals detected by the electronic device are biometric acoustic signals. The cross modal learning model can include a teacher network and a student network such that the teacher network is configured to supervise the training of the student network. In this example, the teacher network is configured to receive biometric wearable signals. The wearable signals can be generated by biometric wearable devices such as such as heart rate sensors or heart rate monitors. The data and wearable signals gathered by one or more wearables does not necessarily have to be associated with the user associated with the electronic device 202. The teacher network is configured to predict and train the student network for identifying acoustic signals in the student network that is similar to that of the acoustic signals in the teacher network already identified as biometric signals such as signals relating to heart rate, breathing rate, chest movements when a person is breathing, etc. The student network is configured to receive the one or more sonar heat maps of the raw acoustic signals, motion patterns from the motion sensors, or both, and receive supervised training by the teacher network. The cross modal network, based on the one or more sonar heat maps and supervised training by the teacher network, can predict by the student network whether the one or more sonar heat maps or portions of the one or more sonar heat maps received of the raw acoustic signals are biometric acoustic signals. In one example, the wearable signals are generated by one or more sensing wearables having a respiration force sensor, a gyroscope, an accelerometer, or a combination thereof, configured to detect raw wearable signals. In one example, each of the teacher and student networks are neural networks. In another example, determining the biometric acoustic signals of the user from the raw acoustic signals captured by the audio transducers includes applying a noise filter algorithm or a noise filter circuit in the electronic device 202.

In one example, biometric image sensing module 220 can include image sensing devices or optical sensing devices such as a camera for capturing facial features and fingerprint reader for capturing fingerprint features of a user.

The biometric image signals and biometric acoustic signals collected by the sensing modules are fused together at a feature extraction module 230 to generate a biometric signal input. In one example, the feature extraction module 230 can include a machine learning model, stored locally on the electronic device 202 to conduct feature extractions of the biometric sensing signals detected and collected by the sensing modules. The feature extraction module 230 can then generate a biometric user signature of the user from the machine learning model. The biometric user signature can be a feature vector having the biometric acoustic signals from the sensing modules. The generated biometric user signature can be received by a privacy preserving module 240. The privacy preserving module 240 can anonymize the biometric user signature by performing a hashing function to the feature vector to generate a hashed biometric user signature. In one example, the privacy preserving module 240 can determine whether the hashed biometric user signature is associated with the user. If the privacy preserving module 240 determines that the hashed biometric user signature is similar to that of a verified hashed signature that the user signature application has already determined to be authentic, such that the already verified hashed signature is associated with the user, then an authentication module 250 can determine that the currently received biometric user signature associated with the currently received biometric image signals and biometric acoustic signals and therefore authenticate the identity of the user based on the sensing signals received. If the similarities between the already verified hashed signature and the currently received hashed biometric user signature are not satisfied, then the authentication module 250 can reject the identity of the user.

Figure 3:
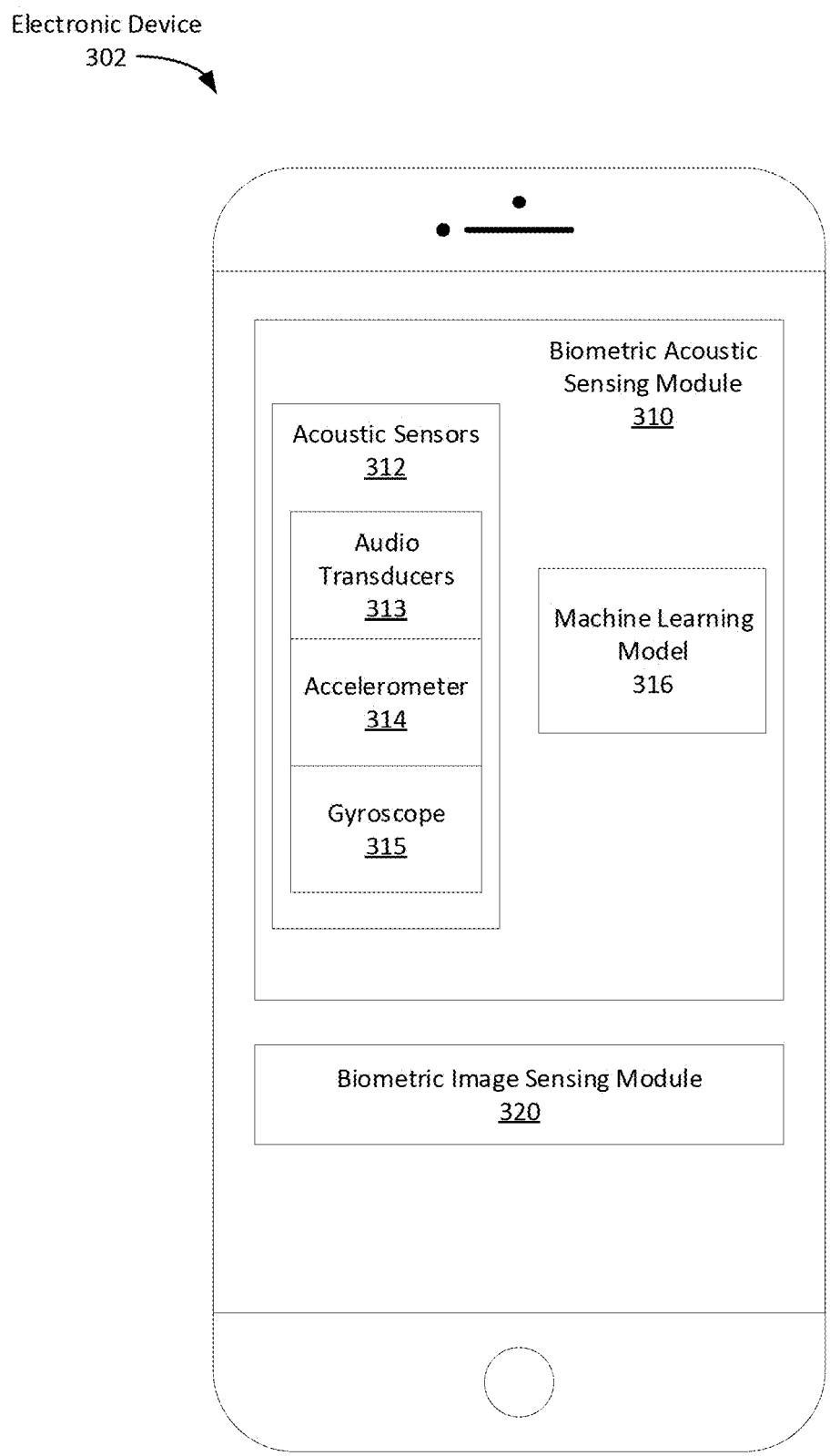
FIG. 3 illustrates an additional example of a computing device for generating biometric signatures in accordance with various aspects of the subject technology.

FIG. 3 illustrates an electronic device 302 having a plurality of applications, modules, and devices locally stored on to the electronic device 302 configured to perform functions related to authenticating an identity of a user via biometric signals similar to that of the system described in FIG. 2. As illustrated in FIG. 3A, an electronic device 302 is configured to include a biometric sensing module 310 configured to sense and detect audio signals and motion of the electronic device 302 such as when a user is physically gripping the electronic device 302. The electronic device 302 can also include biometric acoustic sensing module 310 having sensing devices configured to sense and detect acoustic biometric signals from raw audio signals including acoustic sensors 312 and machine learning model 216. The acoustic sensors 312 can include acoustic sensing devices, motion sensing devices, or a combination thereof. The biometric image sensing module 320 is configured to capture image signals such as facial images having facial features and fingerprint signals. The biometric acoustic sensing module 310 and biometric image sensing module 320 are configured to receive biometric sensing signals including biometric image signals and biometric acoustic signals from a user of the electronic device 302 or a user near the electronic device 302.

In one example, biometric acoustic sensing module 310 can include acoustic sensing devices such as acoustic sensors 312 configured to detect and receive raw acoustic signals associated with the user or of a person physically near the acoustic sensors 312. In one example, the biometric acoustic sensing module 310 can include acoustic sensing devices such as audio transducers 313 including a first audio transducer and second audio transducer. In one example, the first audio transducer can include one or more speakers and the second audio transducer can include one or more microphones. In this example, the speaker and microphone combination can simulate a sonar system to detected reflections of sound waves generated by the speaker. For example, even when the speaker is not actively emitting audible sound to a human, such as voice, notifications, or music, the speakers can emit high frequency audio signals. The audio waves are then reflected off a physical surface of the user such as the user's skin or limb, or surrounding environment of the user such a desk or table that the electronic device 302 was originally set. The reflected audio waves can then be sensed by the microphone. The transmission and collection of audio signals by the speaker and microphone can simulate a sonar heat map of the environment surrounding the electronic device 302 such as chest and lung movement patterns of the user holding the device, and movement of the electronic device itself such as the electronic device 302 being picked up for purposes of prompting biometric sensing for verification of a user. In one example, the biometric acoustic sensing module 310 can also include motion sensors for sensing motion of the electronic device 302 including a gyroscope 315, accelerometer 314, inertial measurement unit ("IMU"), or a combination thereof. The position of the phone detected by the motion sensors can be combined with the reflected audio signals transmitted and received by the speaker and microphone to better calculate and determine acoustic signals of the user. For example, the one or more first audio transducers can transmit ultrasonic audio signals in the frequency range of 11-24 kHz. The one or more second audio transducers can receive and capture ultrasonic audio signals at a sampling rate of 48 kHz. In this example, the raw acoustic signals received by the biometric acoustic sensing module 310 can be detected by an output audio signal via the one or more speakers and receiving an input audio signal based on a reflection of output audio signal on the user via the one or more microphones.

In one example, the raw acoustic signals captured by the audio transducers can be used to determine biometric acoustic signals of the user. For example, the biometric acoustic signals can include breathing patterns, breathing rate, heart rate signal, respiratory patterns, respiratory signal, chest movement, chest expansion, body movement, facial movement, or a combination thereof. The acoustic signals can also include motion signal including hand motion patterns, hand vibration patterns, body movement, or a combination thereof. In this example, identifying the biometric acoustic signals can include generating one or more sonar heat maps of the raw acoustic signals from one or more reflections of ultrasonic waves detected by the microphone in the biometric acoustic sensing module 310. Further, a machine learning model 316 can receive the raw audio signals in the form of one or more sonar heat maps and identify one or more biometric acoustic signals from the raw acoustic signals. For example, the machine learning model 316 can include a cross modal learning model configured to predict and determine whether the one or more raw acoustic signals detected by the electronic device are biometric acoustic signals. The cross modal learning model can include a teacher network and a student network such that the teacher network is configured to supervise the training of the student network. In this example, the teacher network is configured to receive biometric wearable signals. The wearable signals can be generated by biometric wearable devices such as such as heart rate sensors or heart rate monitors. The data and wearable signals gathered by one or more wearables does not necessarily have to be associated with the user associated with the electronic device 302. The teacher network is configured to predict and train the student network for identifying acoustic signals in the student network that is similar to that of the acoustic signals in the teacher network already identified as biometric signals such as signals relating to heart rate, breathing rate, chest movements when a person is breathing, etc. The student network is configured to receive the one or more sonar heat maps of the raw acoustic signals, motion patterns from the motion sensors, or both, and receive supervised training by the teacher network. The cross modal network, based on the one or more sonar heat maps and supervised training by the teacher network, can predict by the student network whether the one or more sonar heat maps or portions of the one or more sonar heat maps received of the raw acoustic signals are biometric acoustic signals. In one example, the wearable signals are generated by one or more sensing wearables having a respiration force sensor, a gyroscope, an accelerometer, or a combination thereof, configured to detect raw wearable signals. In one example, each of the teacher and student networks are neural networks.

In one example, biometric image sensing module 320 can include image sensing devices or optical sensing devices such as a camera for capturing facial features and fingerprint reader for capturing fingerprint features of a user.

Figure 4:
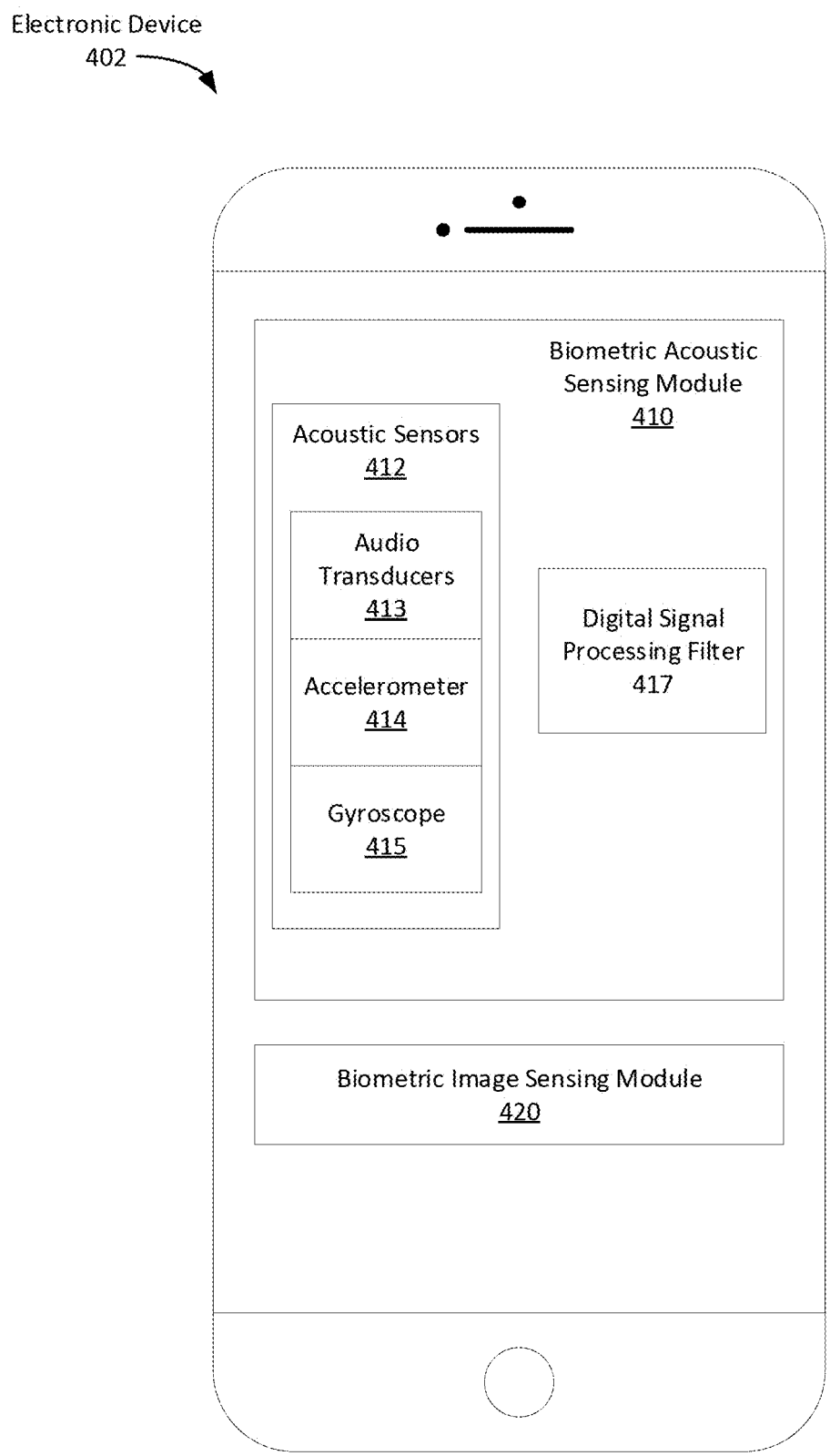
FIG. 4 illustrates an additional example of a computing device for generating biometric signatures in accordance with various aspects of the subject technology.

In another example, as illustrated in FIG. 4, determining the biometric acoustic signals of the user from the raw acoustic signals captured by the audio transducers 413 includes applying a digital signal processing filter 417 in the electronic device 402.

B. Biometric Acoustic Signal Generation

Figure 5:
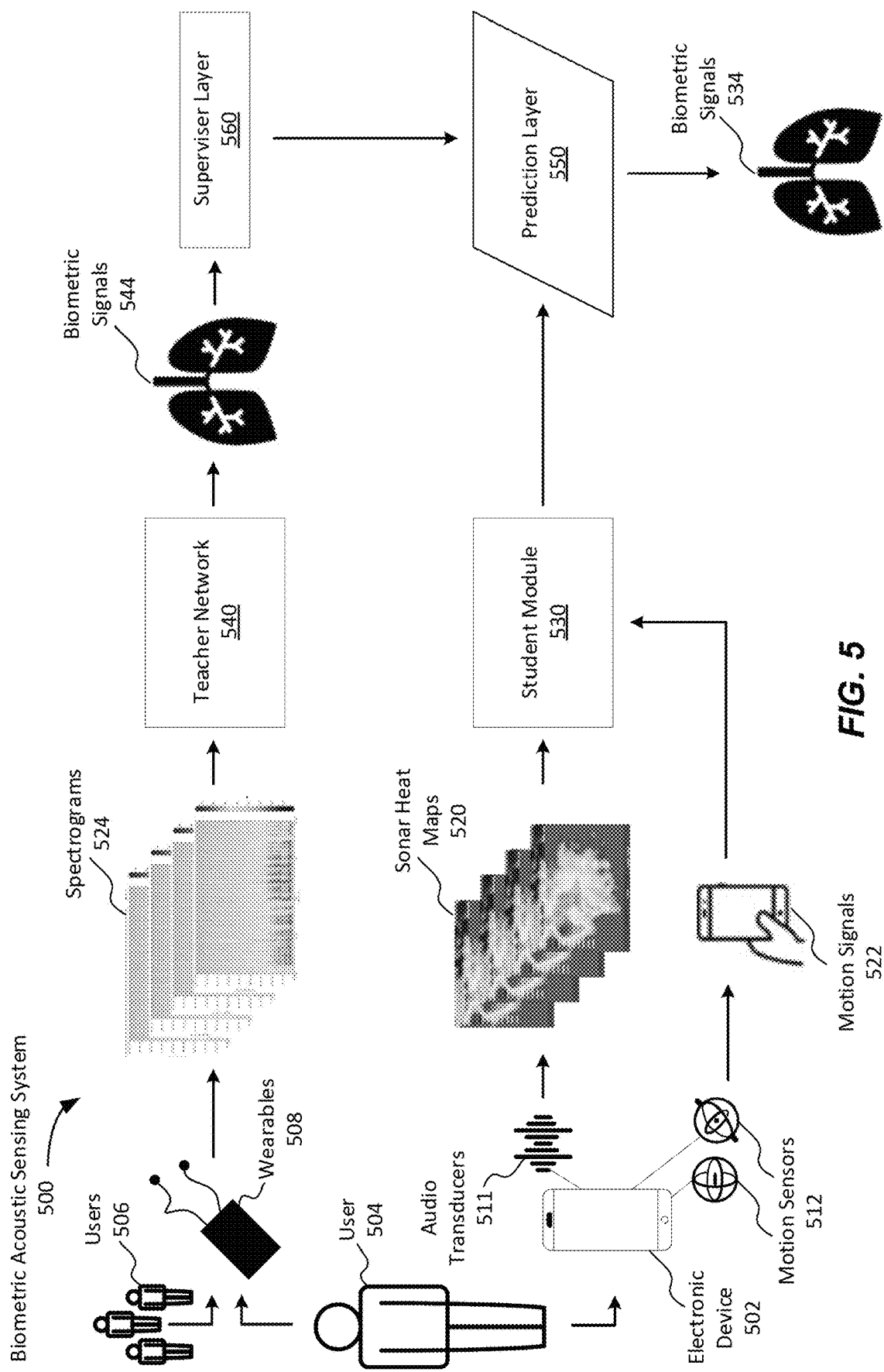
FIG. 5 illustrates an example process for identifying biometric acoustic signals in accordance with various aspects of the subject technology.

FIG. 5 illustrates a more detailed process for identifying biometric acoustic signals from raw acoustic signals. As illustrated in FIG. 5, a biometric acoustic sensing system 500 includes an electronic device 502, one or more wearables 508, a machine learning model including a student network 530 and teacher network 540, a supervisor later 560, and a prediction layer 550. In this system, electronic devices and wearables sensing devices generate and acquire acoustic signals from a user or a plurality of users. Sonar heat maps are generated from the acoustic signals. And one or more neural networks receive the sonar heat maps and predict whether one or more acoustic signals acquired include biometric acoustic signals. In this configuration, the electronic device 502 includes motion sensors 512 including gyroscope and accelerometer motion signals 522 and via audio transducers 511 including one or more speakers and one or more microphones. The electronic device 502 receives raw acoustic signals of a user 504 using the electronic device 502 or near the device either based on a prompt to receive acoustic signals for verification or ambiently and passively detecting acoustic signals of surroundings of the electronic device 502. The raw acoustic data is converted by the biometric acoustic sensing system 500 to one or more sonar heat maps 520. The sonar heat maps 520 and motions signals 522 are then received by the student network and used to predict and identify biometric signals 534 from the sonar heat maps.

In one example, the teacher network 540 receives spectrograms 524 generated by acoustic signals acquired by one or more wearables 508. The wearables acoustic signals can be gathered at a time before the electronic device 502 receives acoustic signals for building sonar heat maps 520. The wearables acoustic signals can be received by the user using wearables 508 or different users 506 using wearables 508. The wearables can be attached to any location on or in the body of a person for classifying body movements. The purpose of the acoustic signals acquired from the wearables is to establish a ground truth for the acoustic signals of the user and to supervise the student learning network of student module 530 for predicting and identifying biometric signals from the raw acoustic signals. In one example, the teacher network 540, having a plurality of identified biometric signals such as respiration rate and heart rate and patterns from wearables signals can be used to provide cross modal supervision and assist the student network by synchronizing acoustic signals and inputs from the wearables that have been identified as biometric signals such as respiration and heart rate with the sonar heat maps 520 generated by the electronic device 502 that include similar acoustic signals to that of the teacher network 540 that have already been identified as biometric signals. In one example, the teacher network can include existing machine learning networks configured to predict body movements or can be trained from receiving wearable acoustic signal inputs. The student module 530 is trained to minimize the difference between its prediction of when a sonar heat maps received includes a biometric signal or signals and the teacher network 540 identifying a biometric signal from the wearable signals. The student network receives sonar heat maps associated with the user and uses existing knowledge or predictions from the teacher network to determine the characteristics of human behavior and movement based on the currently received sonar heat map. The prediction layer 550 then determines whether a received acoustic signal from the student module 530 is similar to any and all of biometric signals received by the supervisor layer 560 predicted and sent from the teacher network 540. Once there is a match or a mean prediction error between the predictions of the teacher and the student network is minimized to under a threshold, the prediction layer 550 can output a prediction that one or more sonar heat maps 520 received by the student module 530 is a biometric acoustic signal.

C. Feature Extraction and Privacy Preserving Hashing

Figure 6A:
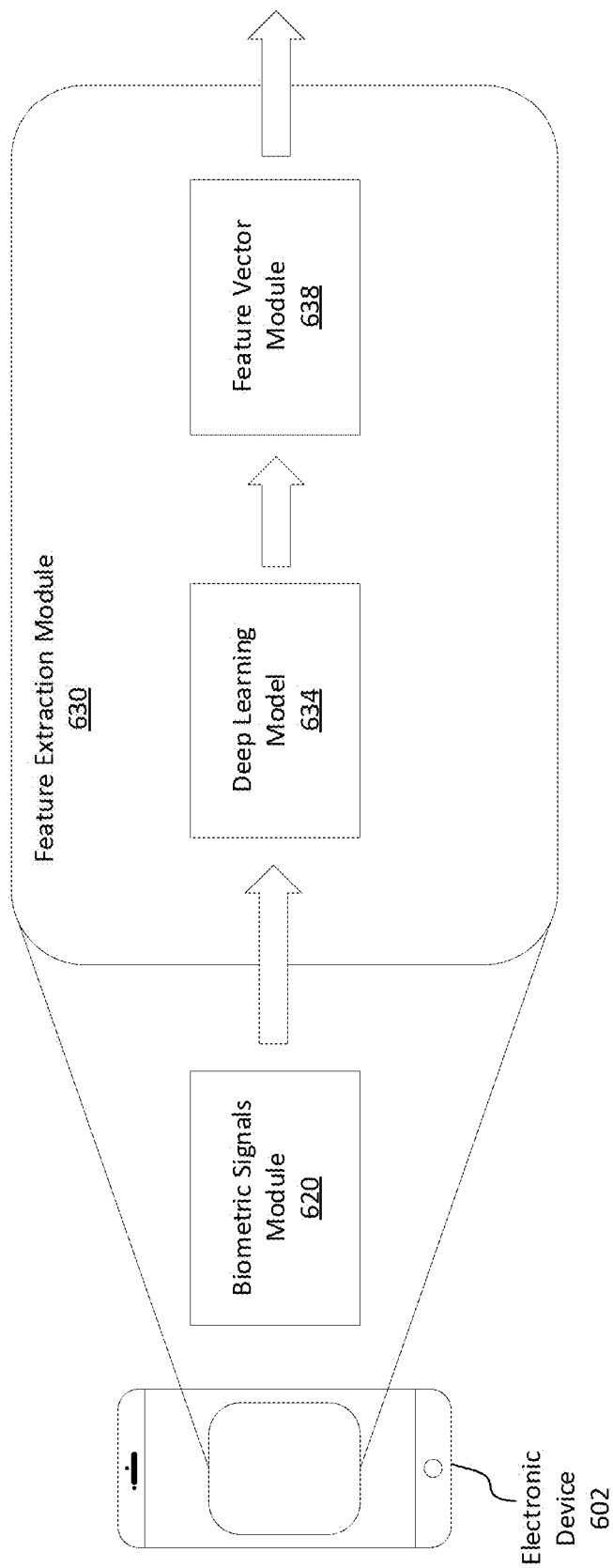
FIGS. 6A-B illustrate an example processes for identifying features of biometric signals in accordance with various aspects of the subject technology.
Figure 6B:
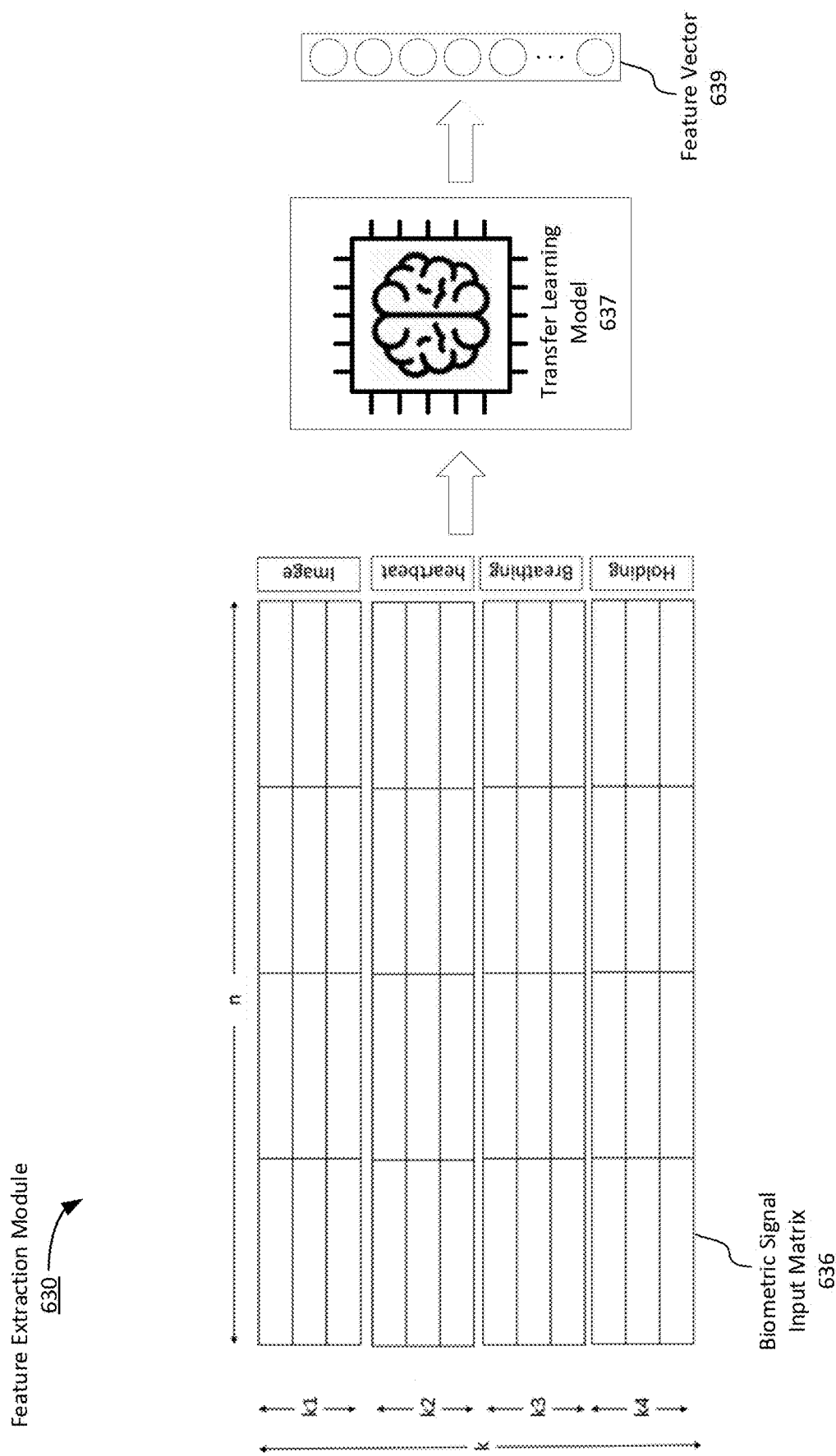

FIG. 6A-B illustrate example processes of for identifying features of biometric signals. Similar to the system architecture 100 of FIG. 1A-C, as illustrated in FIGS. 6A-B, an electronic device 602 includes applications and modules for authenticating a user including a biometric signals module 620, a feature extraction module 630 including a deep learning model 634 and feature vector module 638. The feature extraction module 630 is configured to generate biometric signal input matrix 636, processed by a deep learning model including a transfer learning model 637 and generate a feature vector 639.

In one example, the biometric acoustic signals and biometric image signals are received by the feature extraction module 630 from a biometric signals module 620 similar of that of biometric signals extracted from modules in previously mentioned figures. The biometric image signals and biometric acoustic signals are then are fused. The feature extraction module 630 can process the biometric image by arranging the features of the biometric image signals and biometric acoustic signals sequentially in a matrix, such as a k×n matrix. In one example, the k×n matrix can include sub matrixes having kth rows and n columns. For example a k1 set of rows with n columns can be individual or clustered pixels of the biometric image signals received by the biometric signals module 620. The image signals can be images of a face distributed among rows and columns of pixels that form the face. The image signals can also be an image of a fingerprint with rows and columns of pixels that form the fingerprint. In one example, a k2-kth set of rows can be divided into categories of acoustic signals. For example, a k2 set of rows contain a set of heartbeats detected and identified by the biometric signals module 620. In this example, each n column can include a different power spectral density associated with a heartbeat over time intervals split into n columns. And each k1 type row can represent a different heartbeat detected. In another example, different breathing rate metrics can fill the n columns. For example, a mean heart rate can fill the space of n1, a standard deviation of the heart rate can fill the space of n2, the median heart rate can fill the space of n3, etc., over a interval of time and each k1 row can indicate a different heartbeat by intervals. The same principles apply to other biometric acoustic signals arranged in the k×n matrix such as breathing rate, chest movement, hand holding of the electronic device, hand grip or vibration of the electronic device, and so forth.

In one example, the k×n matrix generated can be processed through the deep learning model 634. The deep learning model 634 includes a transfer learning model 637 having pretrained data and signals associated with known biometric acoustic and image features for training the deep learning model. The machine learning model 634 applies the transfer learning model 637 and conducts feature extraction of the k×n matrix having a plurality of biometric acoustic signals and biometric image signals to generate a biometric user signature of the user. In this example, the output is generated by a feature vector module 638 of the feature extraction module 630 and outputs a feature vector 639. The feature vector 639 can be an m-dimensional vector embedding, where m can range from 128 to 2048 dimensions, each carrying a feature related to biometric acoustic or biometric image features of the user to form the biometric user signature of the user In one example, multiple k×n matrices can be generated, each denoting a biometric image signals or a biometric acoustic signal. The transfer learning model 637 and the feature vector module 638 can output a plurality of m-dimensional feature vectors associated with each of the k×n matrices such that each of the plurality of m-dimensional feature vectors is associated with a biometric acoustic signal of the one or more biometric acoustic signals or a biometric image signal. For example, a first feature vector can be an m-dimensional vector associated with a user's heartbeat rate. A second feature vector can be an m-dimensional vector associated with the user's holding pattern or position. The m-dimensional vector can include a 128-2048 dimension embedding. In one example, each of a plurality of k×n matrices are processed through the deep learning model 634.

In one example, the transfer learning model 637 of deep learning model 634 includes a pretrained neural network from another task configured to receive biometric image signals data or biometric acoustic signals data. This step eliminates the need to train a large dataset of biometric signals from scratch and helps to generate high level features from input data.

In one example, during an enrollment phase where the user is tasked to perform initial set up and present biometric visual and acoustic signals to a user signature application, frames of user video can be fed into a deep learning model including convolutional neural networks ("CNNs") which can generate a plurality of 128 dimensional embeddings per video received. The embeddings can then be fed to a clustering algorithm such a support vector machine or k-nearest neighbors ("kNNs") to generate a cluster centroid representing 128 dimensional user facial identity, 128 dimensional user behaviors from acoustic signals.

The next step in authenticating a user given an m-dimensional embedding is to perform a privacy-preserving hashing to the feature vector to generate anonymized user signature from sensitive biometrics and behavior traits manifested in acoustic and image signals. The privacy preserving hashing can be locality sensitive hashing ("LSH") such which converts a high dimensional space such as a feature vector to a low-dimensional space and compare the hashed feature vector to similar items having similar characteristics such that the similar hashed signatures have a higher collision probability. The locality sensitive hashing can be performed to preserve privacy while reducing the computational load and complexity of biometric signals embedded in a feature vector. For example, by relying on statistics and performing LSH, an authentication system can determine that two sets of biometric signals, while different, are from the same user or person based on the similarity of the two hashed sets of biometric signals.

Figure 7:
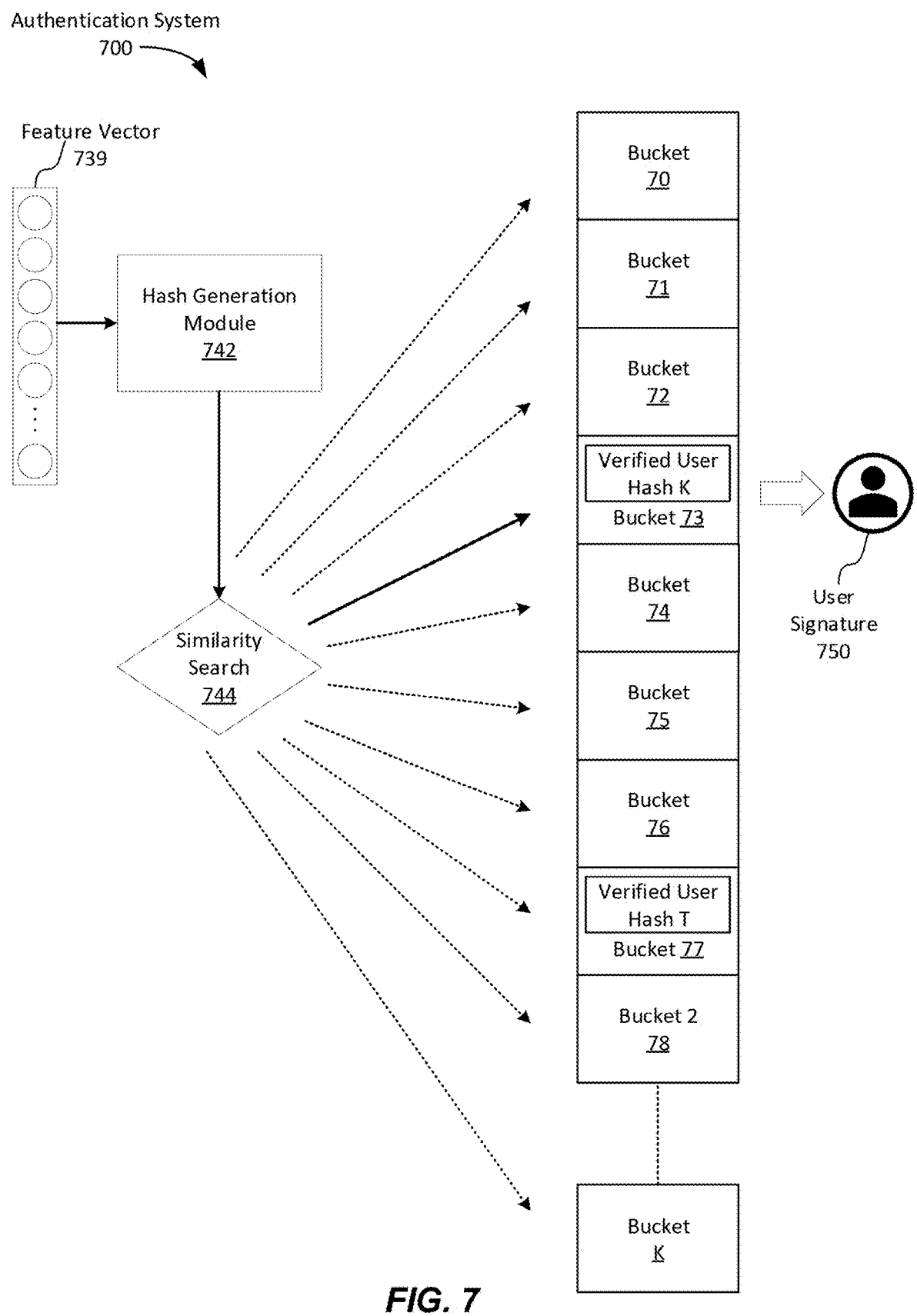
FIG. 7 illustrates an example process for performing privacy preserving generation of a user signature in accordance with various aspects of the subject technology.

As illustrated in FIG. 7, an authentication system 700 includes hash generation module 742 configured to receive a feature vector 739. The hash generation module 742 hashes the feature vector 739 to create a hashed biometric user signature and is used to compare with other known hashed signatures via a similarity search 744. In one example, the hash generation module 742 performs a privacy preserving hashing function to the feature vector received. In one example, the hashed biometric user signatures are hashed into buckets using locality sensitive hashing ("LSH") such that hashed embeddings near each other, which means the hashes are likely associated with the same user even though the specific acoustic and image signals related to the user are unknown at this point, are in the same buckets with a high probability. And hashed embeddings far from each other are likely in different buckets and do not associate with the same user. The hashed vector is anonymized such that specific user biometric signals cannot be obtained when only viewing the hashed signature. In one example, the similarity search 744 of the hashed biometric user signature of feature vector 739 is placed into a bucket among a plurality of k buckets. For example, hash generation module 742 will perform locality sensitive hashing functions to the inputs, for example a feature vector, and place the result in byte sequences in a bucket among a plurality of various buckets. The hash generation module 742 can perform the locality sensitive hashing functions and place the result in a bucket among a plurality of k buckets. In one example, the k buckets are configured in powers of two such that in when represented in bit sequences, an n number of bits will be configured to have k=2^n buckets.

In one example, each bucket k, created by the result of the LSH functions applied to the feature vectors, can contain hashed functions related to different users that was acquired during an enrollment process of setting up biometric image and acoustic signatures of different users in a network. When the current hashed biometric user signature of feature vector 739 is received by the hash generation module 742, the authentication system 700, via the LSH functions determine whether the currently hashed biometric user signatures satisfies a predetermined probabilistic threshold with an enrollment hashed signature of the user.

For example, during an enrollment phase, a user can be prompted to provide an image of the user's face and fingerprint. The user may also be prompted to hold the electronic device with biometric sensing modules and breathe near the device. The electronic device can collect image signals and acoustic signals associated with the user during the enrollment phase. The electronic device, through a biometric sensing module, feature extraction module and privacy preserving module can obtain an initial feature vector associated with the user during enrollment, hash the feature vector and place the enrollment hashed signature of the user in a bucket among a plurality of buckets. The plurality of buckets each containing different hashed user signatures such that each hashed user signature is a low-dimensional byte sequence, for example lower-dimensional buckets from the smaller number of bits once the feature vector is hashed, obtained from the received feature vectors. In one example, the plurality of buckets can include thousands or millions of hashed user signatures. In practice, no single breath, heartrate detected, hand motion, or combination can be the exact same as that of a previously detected breath, heart rate, hand motion, or a combination thereof, even from the same person. But the breathing pattern, heart rate and chest movement pattern, hand motion and vibration of a user detected at a first time and a second time, while not completely identical, are similar compared to that of a different person. Thus, a hashed feature vector of the same user as that of the enrollment feature vector, while not identical can be very similar. For example, even though a first feature vector, for example the enrollment biometric user signature containing biometric acoustic and image signals, is not identical to that of a second feature vector, a currently received feature vector, the authentication system in an electronic device can still determine that the two feature vectors are associated with the same person, thus verifying the user prompting the second feature vector.

In one example, an additional privacy preserving action can be performed to further anonymize the generated user signature output. In this example, local differential privacy ("LDP") can be performed such that a hashed user signature, when received by a party, cannot be reverse engineered. LDP protects individual privacy in the process of data collection. For example, a randomized noise is added to the biosignatures such that a collector of the signature can still verify that the biosignature is associated with a user but cannot determine the parameters which gave the resulting hashed biosignature. For example, noise is added to the user input before passing the noise added user input to the hashing function. In one example, the process of adding noise to the feature vectors before hashing can be performed using generative adversarial privacy.

For example, the user's enrollment biometric signature can be the verified user hash k. The plurality of buckets k, including bucket 77, can contain a different verified user hash T such that verified user hash T is not the same as that of user K. If user K is currently prompted to be verified for a transaction or, or a long, or another activity that requires biometric verification, a feature 739 can be currently generated based on biometric acoustic signals and biometric image signals of user K. The hash generation module 742 will hash the feature vector 739 and place the hashed feature vector into a bucket with a verified user hash that is similar to that of the currently hashed feature vector. In such a case, if the currently received hashed feature vector is derived from biometric acoustic and image signals of user K, then the hashed feature vector will likely be similar to that of verified user hash K in bucket 73. The authentication system 700 via the similarity search 744 will likely place the currently hashed feature vector 739 in bucket 73. In this case, the authentication system can determine that the user is identified because the feature vector is likely associated with user K because of its similarity to that of verified user hash of user K and signal a verifier the user signature 750 that the identity of the user is verified.

In one example, multiple k×n matrices can be processed to produce multiple feature vectors such that each feature vector is associated with a different biometric characteristic such a biometric image signal or a biometric acoustic signal. Each of the feature vectors are hashed via the hash generation module 742 to generate multiple hashed vectors.

In one example, the predetermined threshold embedded within the LSH configured to determine whether a hashed function belongs to a bucket containing a different hashed signature can be an 80% similarity.

D. Example Processes of Authenticating a User

Figure 8A:
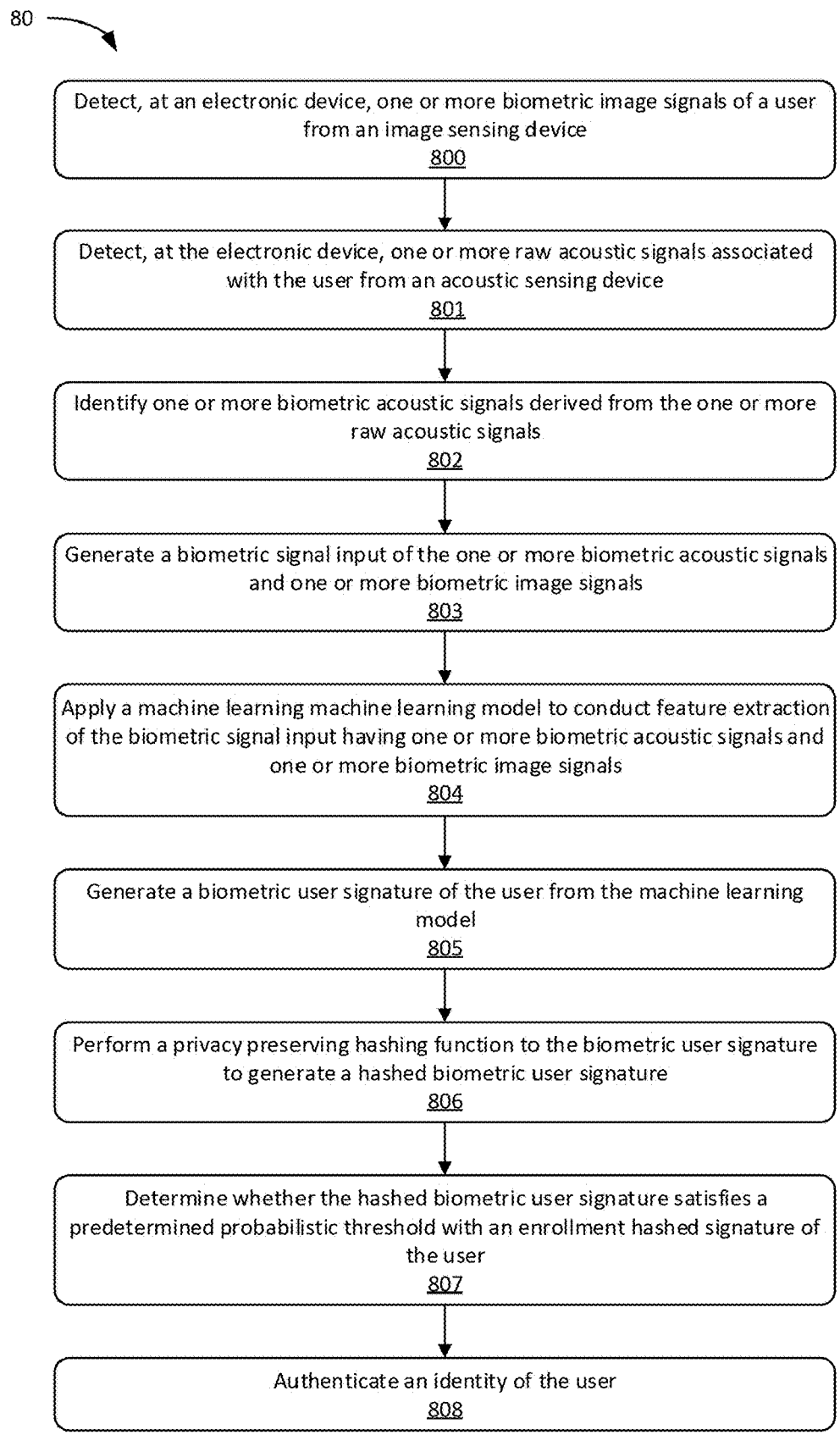
FIGS. 8A-B illustrate flow charts of example processes for generating biometric signatures in accordance with various aspects of the subject technology.
Figure 8B:
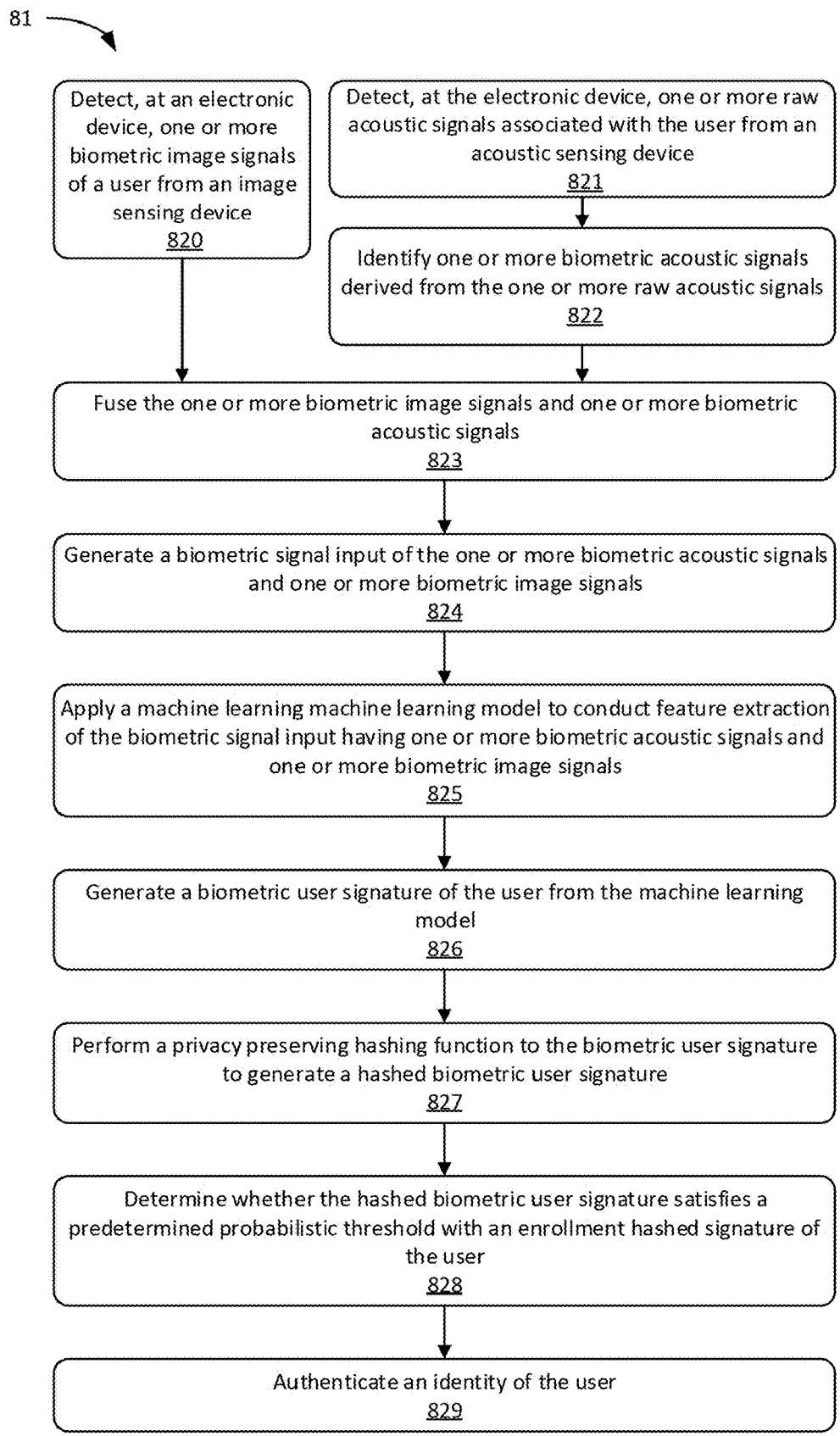

FIGS. 8A-B illustrate flow charts of example processes for generating biometric signatures.

In the example flow diagram 80 of FIG. 8A, at block 800, a computer-implemented system can detect, at an electronic device, one or more biometric image signals of a user from an image sensing device.

At block 801, the system can detect, at the electronic device, one or more raw acoustic signals associated with the user from an acoustic sensing device.

At block 802, the system can identify one or more biometric acoustic signals derived from the one or more raw acoustic signals.

At block 803, the system can generate a biometric signal input of the one or more biometric acoustic signals and one or more biometric image signals.

At block 804, the system can apply a machine learning machine learning model to conduct feature extraction of the biometric signal input having one or more biometric acoustic signals and one or more biometric image signals.

At block 805, the system can generate a biometric user signature of the user from the machine learning model.

At block 806, the system can perform a privacy preserving hashing function to the biometric user signature to generate a hashed biometric user signature.

At block 807, the system can determine whether the hashed biometric user signature satisfies a predetermined probabilistic threshold with an enrollment hashed signature of the user.

And at block 808, the system can authenticate an identity of the user.

In the example flow diagram 81 of FIG. 8B, at block 820, a computer-implemented system can detect, at an electronic device, one or more biometric image signals of a user from an image sensing device.

At block 821, the system can detect, at the electronic device, one or more raw acoustic signals associated with the user from an acoustic sensing device.

At block 822, the system can identify one or more biometric acoustic signals derived from the one or more raw acoustic signals.

At block 823, the system can fuse the one or more biometric image signals and one or more biometric acoustic signals.

At block 824, the system can generate a biometric signal input of the one or more biometric acoustic signals and one or more biometric image signals.

At block 825, the system can apply a machine learning machine learning model to conduct feature extraction of the biometric signal input having one or more biometric acoustic signals and one or more biometric image signals.

At block 826, the system can generate a biometric user signature of the user from the machine learning model.

At block 827, the system can perform a privacy preserving hashing function to the biometric user signature to generate a hashed biometric user signature.

At block 828, the system can determine whether the hashed biometric user signature satisfies a predetermined probabilistic threshold with an enrollment hashed signature of the user.

And at block 829, the system can authenticate an identity of the user.

Figure 9A:
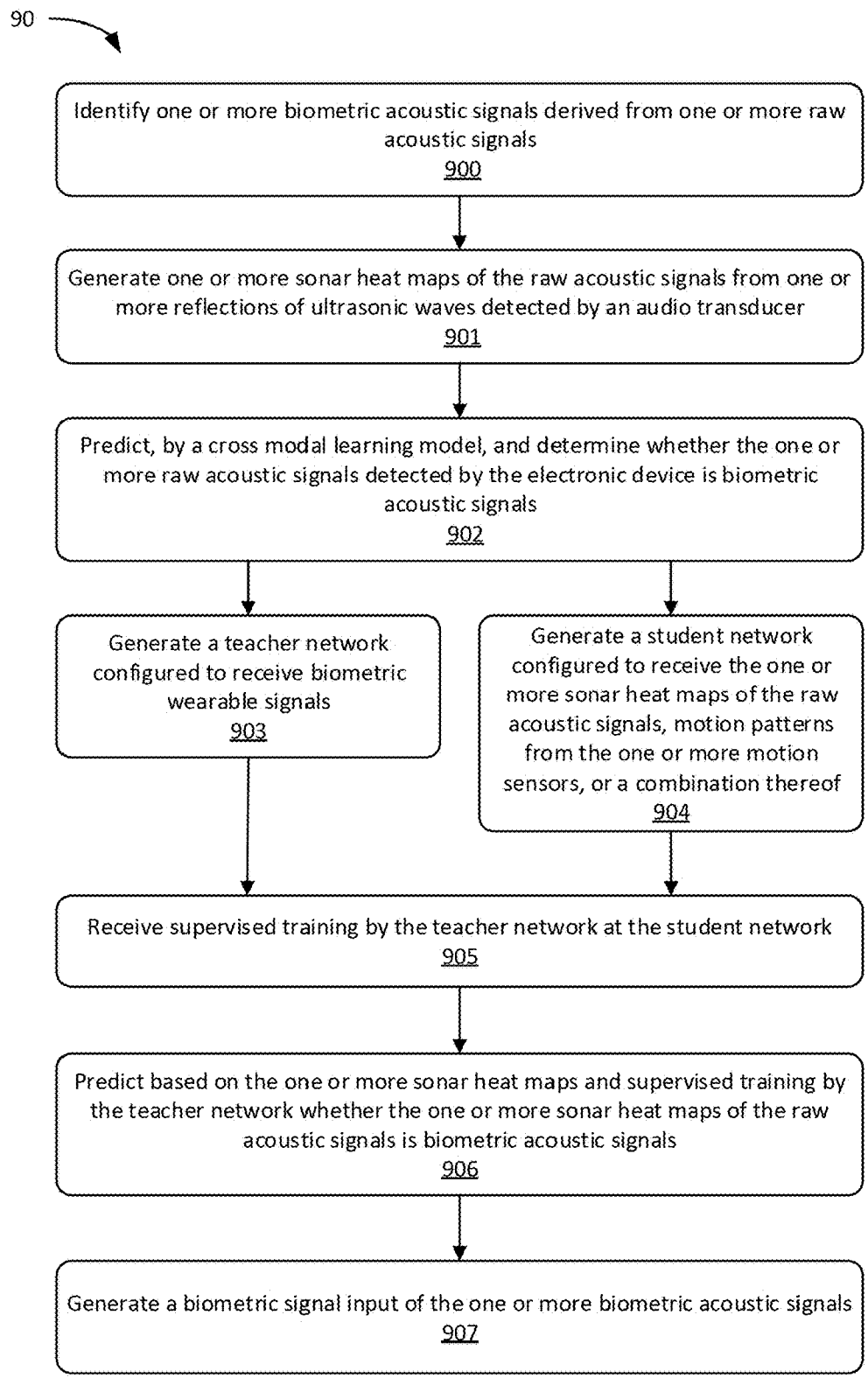
FIGS. 9A-B illustrate flow charts of example processes for identifying biometric acoustic signals in accordance with various aspects of the subject technology.
Figure 9B:
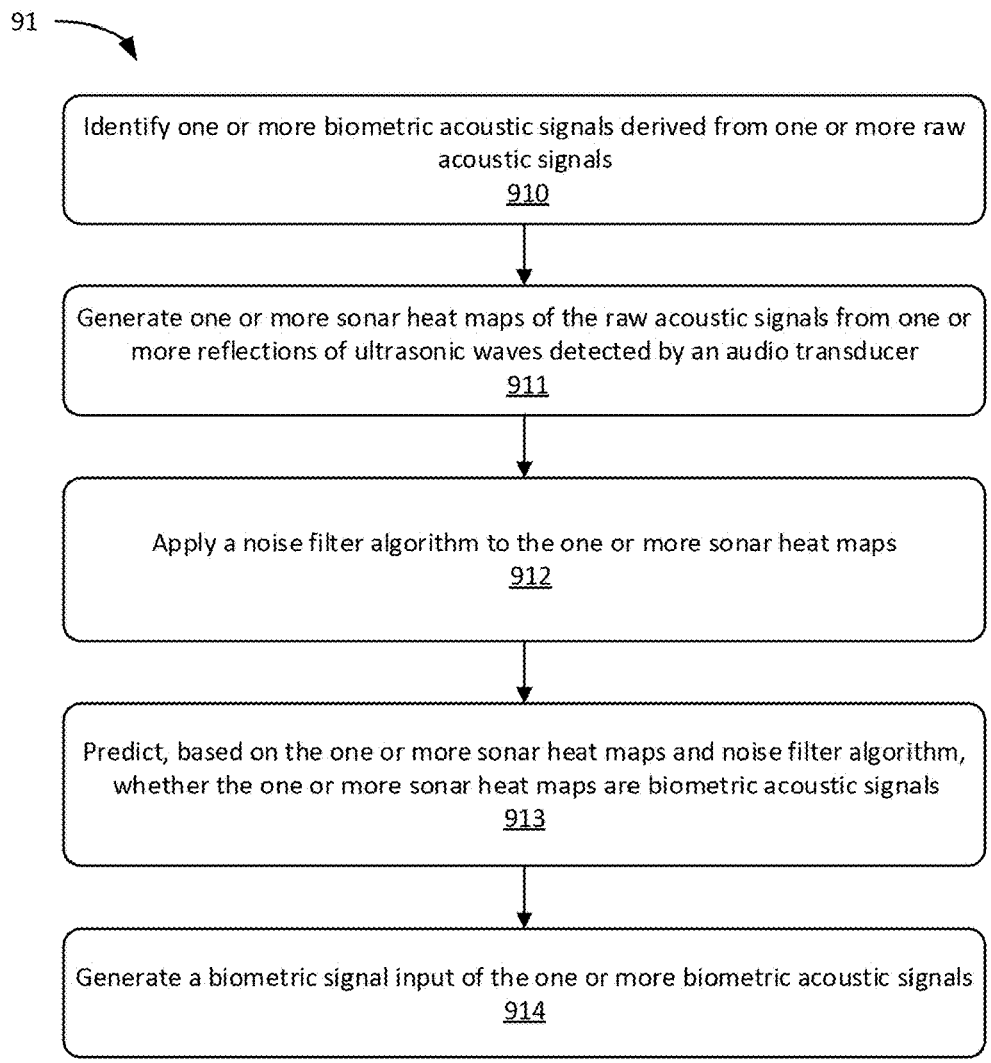

FIGS. 9A-B illustrate flow charts of example processes for identifying biometric acoustic signals.

In the example flow diagram 90 of FIG. 9A, at block 900, a computer-implemented system can identify one or more biometric acoustic signals derived from one or more raw acoustic signals.

At block 901, the system can generate one or more sonar heat maps of the raw acoustic signals from one or more reflections of ultrasonic waves detected by an audio transducer.

At block 902, the system can predict, by a cross modal learning model, and determine whether the one or more raw acoustic signals detected by the electronic device is biometric acoustic signals.

At block 903, the system can generate a teacher network configured to receive biometric wearable signals.

At block 904, the system can generate a student network configured to receive the one or more sonar heat maps of the raw acoustic signals, motion patterns from the one or more motion sensors, or a combination thereof.

At block 905, the system can receive supervised training by the teacher network at the student network.

At block 906, the system can predict based on the one or more sonar heat maps and supervised training by the teacher network whether the one or more sonar heat maps of the raw acoustic signals is biometric acoustic signals.

And at block 907, the system can generate a biometric signal input of the one or more biometric acoustic signals.

In the example flow diagram 91 of FIG. 9B, at block 910, a computer-implemented system can identify one or more biometric acoustic signals derived from one or more raw acoustic signals.

At block 911, the system can generate one or more sonar heat maps of the raw acoustic signals from one or more reflections of ultrasonic waves detected by an audio transducer.

At block 912, the system can apply a noise filter algorithm to the one or more sonar heat maps.

At block 913, the system can predict, based on the one or more sonar heat maps and noise filter algorithm, whether the one or more sonar heat maps are biometric acoustic signals.

And at block 914, the system can generate a biometric signal input of the one or more biometric acoustic signals.

Figure 10:
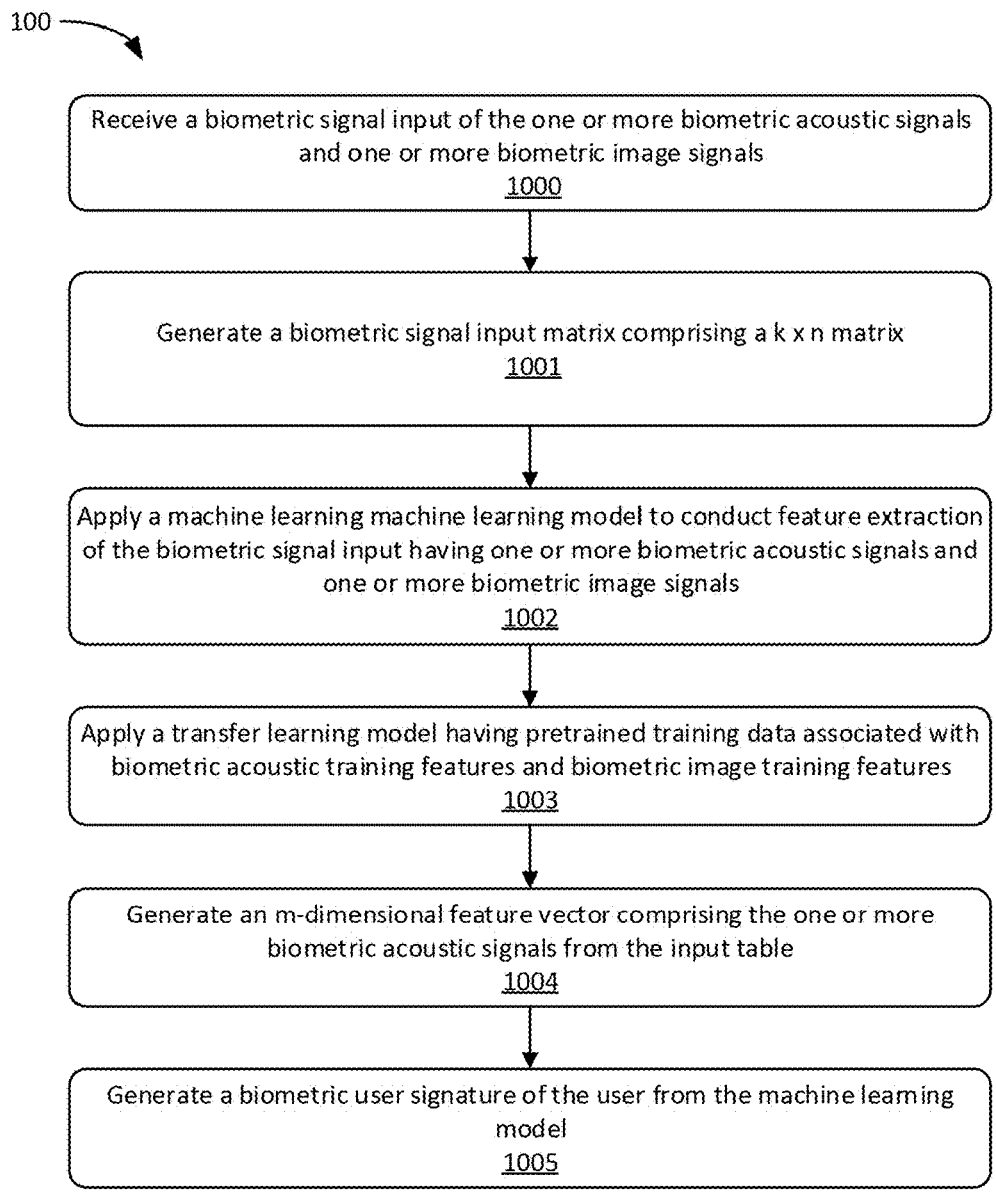
FIG. 10 illustrates a flow chart of an example process for identifying features of biometric signals in accordance with various aspects of the subject technology.

FIG. 10 illustrates a flow chart of an example process for identifying features of biometric signals.

In the example flow diagram 100 of FIG. 10, at block 1000, a computer-implemented system can receive a biometric signal input of the one or more biometric acoustic signals and one or more biometric image signals.

At block 1001, the system can generate a biometric signal input matrix comprising a k×n matrix.

At block 1002, the system can apply a machine learning machine learning model to conduct feature extraction of the biometric signal input having one or more biometric acoustic signals and one or more biometric image signals.

At block 1003, the system can apply a transfer learning model having pretrained training data associated with biometric acoustic training features and biometric image training features.

At block 1004, the system can generate an m-dimensional feature vector comprising the one or more biometric acoustic signals from the input table.

And at block 1005, the system can generate a biometric user signature of the user from the machine learning model.

Figure 11:
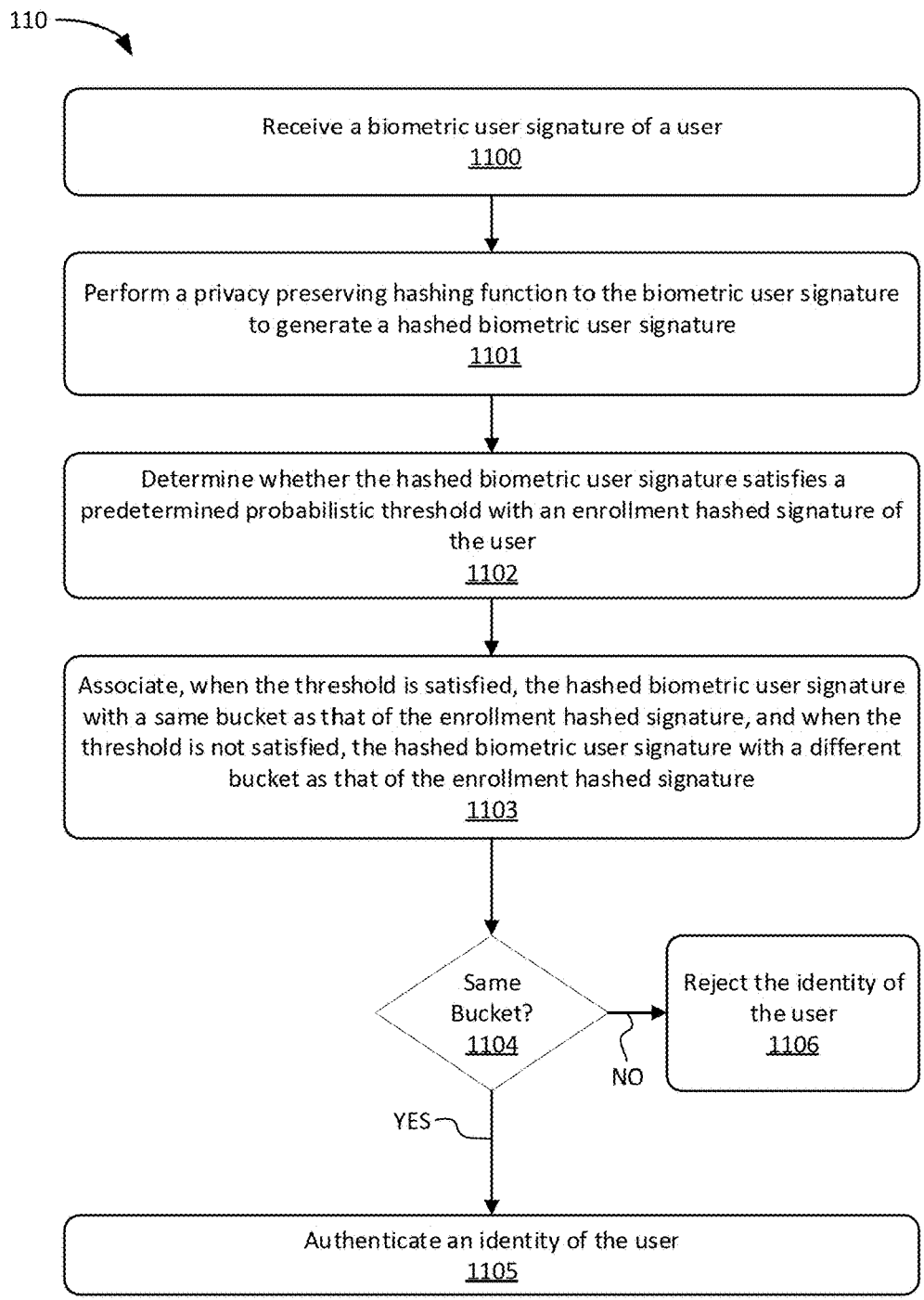
FIG. 11 illustrates a flow chart of an example process for performing privacy preserving generation of a user signature in accordance with various aspects of the subject technology.

FIG. 11 illustrates a flow chart of an example process for performing privacy preserving generation of a user signature.

In the example flow diagram 110 of FIG. 11, at block 1100, a computer-implemented system can Receive a biometric user signature of a user.

At block 1101, the system can Perform a privacy preserving hashing function to the biometric user signature to generate a hashed biometric user signature.

At block 1102, the system can Determine whether the hashed biometric user signature satisfies a predetermined probabilistic threshold with an enrollment hashed signature of the user.

At block 1103, the system can Associate, when the threshold is satisfied, the hashed biometric user signature with a same bucket as that of the enrollment hashed signature, and when the threshold is not satisfied, the hashed biometric user signature with a different bucket as that of the enrollment hashed signature.

At block 1104, the block is a decision block. Depending on the identification of whether the hashed biometric user signature has been placed in the same bucket as that of the enrollment hashed signature will lead to the performance of block 1105 or 1106.

At block 1105, the system can Authenticate an identity of the user.

And at block 1106, if the system identifies that the hashed biometric user signature was not placed in the same bucket as that of the enrollment hashed signature, the system can reject the identity of the user.

Figure 12:
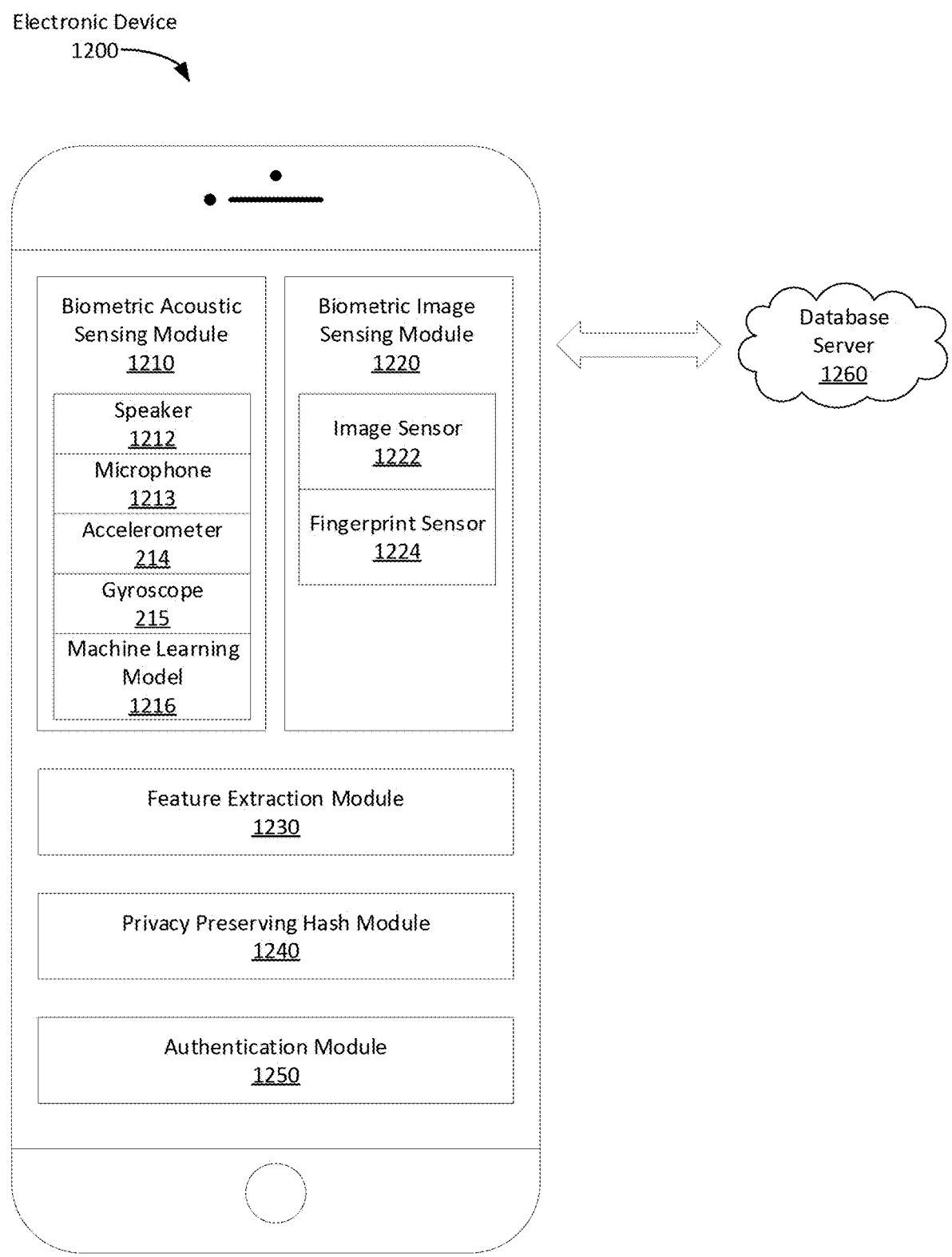
FIG. 12 shows an additional illustration of a computing device for generating biometric signatures in accordance with various aspects of the subject technology.

As illustrated in FIG. 12 an electronic device 1200 having a plurality of applications, modules, and devices locally stored on to the electronic device 1200 configured to perform functions related to authenticating an identity of a user via biometric signals similar to that of the system described in FIGS. 2 and FIGS. 3A-B. According FIG. 12, an electronic device 1200 is configured to include a biometric acoustic sensing module 1210 configured to sense and detect audio signals and motion of the electronic device 1200 such as when a user is physically gripping the electronic device 1200. The electronic device 1200 can also include biometric acoustic sensing module 1210 having sensing devices configured to sense and detect acoustic biometric signals from raw audio signals including speaker 1212 and microphone 1213, accelerometer 1214, gyroscope 1215, and machine learning model 1216. The biometric image sensing module 1220 is configured to capture image signals such as facial images having facial features and fingerprint signals. The biometric image sensing module 1220 can include an image sensor 1222 such a camera and a fingerprint sensor 1224 such as a fingerprint scanner.

In one example, the sensing biometric signals can be stored in a database server 1260 via a cloud network connection associated with the user signature application. The database server stores biometric sensing signals for training machine learning models and does not communicate directly with verifiers other than the user signature application.

In one example, the raw acoustic signals captured by the microphone 1213 and speaker 1212 can be used to determine biometric acoustic signals of the user. For example, the biometric acoustic signals can include breathing patterns, breathing rate, heart rate signal, respiratory patterns, respiratory signal, chest movement, chest expansion, body movement, facial movement, or a combination thereof. The acoustic signals can also include motion signal including hand motion patterns, hand vibration patterns, body movement, or a combination thereof. In this example, identifying the biometric acoustic signals can include generating one or more sonar heat maps of the raw acoustic signals from one or more reflections of ultrasonic waves detected by the microphone in the biometric acoustic sensing module 1210. Further, a machine learning model 1216 can receive the raw audio signals in the form of one or more sonar heat maps and identify one or more biometric acoustic signals from the raw acoustic signals. For example, the machine learning model 1216 can include a cross modal learning model configured to predict and determine whether the one or more raw acoustic signals detected by the electronic device are biometric acoustic signals. The cross modal learning model can include a teacher network and a student network such that the teacher network is configured to supervise the training of the student network. In this example, the teacher network is configured to receive biometric wearable signals. The wearable signals can be generated by biometric wearable devices such as such as heart rate sensors or heart rate monitors. The data and wearable signals gathered by one or more wearables does not necessarily have to be associated with the user associated with the electronic device 1200. The teacher network is configured to predict and train the student network for identifying acoustic signals in the student network that is similar to that of the acoustic signals in the teacher network already identified as biometric signals such as signals relating to heart rate, breathing rate, chest movements when a person is breathing, etc. The student network is configured to receive the one or more sonar heat maps of the raw acoustic signals, motion patterns from the motion sensors, or both, and receive supervised training by the teacher network. The cross modal network, based on the one or more sonar heat maps and supervised training by the teacher network, can predict by the student network whether the one or more sonar heat maps or portions of the one or more sonar heat maps received of the raw acoustic signals are biometric acoustic signals. In one example, the wearable signals are generated by one or more sensing wearables having a respiration force sensor, a gyroscope, an accelerometer, or a combination thereof, configured to detect raw wearable signals. In one example, each of the teacher and student networks are neural networks.

The biometric image signals and biometric acoustic signals collected by the sensing modules are fused together at a feature extraction module 1230 to generate a biometric signal input. In one example, the feature extraction module 230 can include a machine learning model, stored locally on the electronic device 1200 to conduct feature extractions of the biometric sensing signals detected and collected by the sensing modules. The feature extraction module 1230 can then generate a biometric user signature of the user from the machine learning model. The biometric user signature can be a feature vector having the biometric acoustic signals from the sensing modules. The generated biometric user signature can be received by a privacy preserving hash module 1240. The privacy preserving hash module 1240 can anonymize the biometric user signature by performing a hashing function to the feature vector to generate a hashed biometric user signature. In one example, the privacy preserving hash module 1240 can determine whether the hashed biometric user signature is associated with the user. If the privacy preserving hash module 1240 determines that the hashed biometric user signature is similar to that of a verified hashed signature that the user signature application has already determined to be authentic, such that the already verified hashed signature is associated with the user, then an authentication module 1250 can determine that the currently received biometric user signature associated with the currently received biometric image signals and biometric acoustic signals and therefore authenticate the identity of the user based on the sensing signals received. If the similarities between the already verified hashed signature and the currently received hashed biometric user signature are not satisfied, then the authentication module 1250 can reject the identity of the user.

Figure 13:
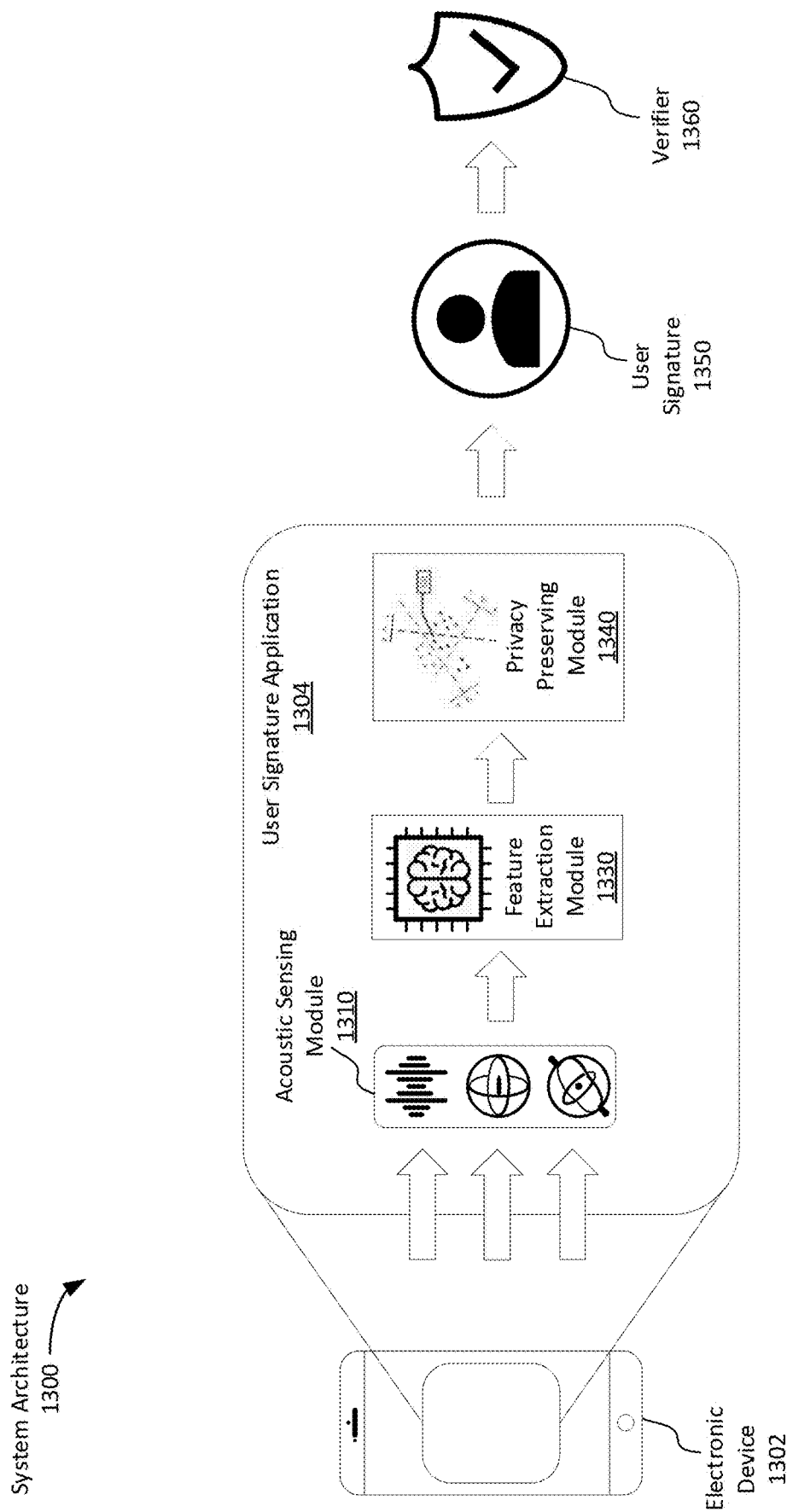
FIG. 13 shows an additional environment of a computer system for generating biometric signatures in accordance with various aspects of the subject technology.

FIG. 13 illustrates an additional system environment of a computer system for generating biometric signatures similar to that of the system environment described in FIG. 1A-C. As illustrated in FIG. 13, a system architecture 1300 includes an electronic device 1300 having a user signature application 1304 configured to generate a privacy preserving user signature such as user signature 1350 to communicate with a verifier 1360 an identity of a user of the electronic device 1302. In this example the user signature application includes an acoustic sensing module 1320 similar to that of acoustic sensing module 110, feature extraction module 1330 similar to that of feature extraction module 130, and privacy preserving module 1340 similar to that of privacy preserving module 140. In this example, biometric image signals are not necessarily acquired by the electronic device and used to verify the user of the electronic device. The electronic device verifies the use solely from raw biometric acoustic signals. Similarly to the discussion in FIGS. 1, 2, 3A-B, 4, 5, 6, and 7, raw acoustic signals are acquired. The biometric acoustic signals and processed and can be identified as biometric acoustic signals. The acoustic signals are processed via machine learning models to generate a feature vector associated with the biometric acoustic signals. The feature vector is anonymized by performing a locality sensitive hashing function and compared with similar hashed functions to determine whether the feature vector is likely associated with a pre verified user signature. If a condition or threshold is satisfied, the computer implemented system can authenticate an identity of the user upon detecting that the hashed feature vector of the biometric user signature satisfied the predetermined threshold.

In one example, the image sensing devices described above can include an iris scanner, a fingerprint sensor, an optical camera, a depth sensing camera, or a combination thereof. The electronic device is not limited to a mobile device and can be, but not limited to, a laptop, desktop computer with acoustic sensing devices, wearable devices, automobiles, smoke detectors, home security system, IOT smart assistants and other IOT devices such as smart alarms and cameras. For example, the electronic device can determine when a user has the intent of opening a lock or a door or an automobile door having IoT smart technology using acoustic waves and authenticate using biometrics having image, or acoustic characteristics, or both. In one example, the electronic device can be deployed on an IoT smart devices having acoustic sensing devices.

In one example, the chest movement is detected by the expansion and movement of the chest, vibration of limbs, or a combination thereof. The chest movement detected can be processed to determine a user's breathing pattern, heartbeats, abdomen movement pattern, or a combination thereof.

In one example, the acoustic sensing modules described above can sense any body movement of a person. In one example, the acoustic sensing modules described above can sense voice recognition.

In one example, detecting one or more biometric image signals and one or more raw acoustic signals can be activated in response to an authentication request by the user or by an online application prompting verification. In another example, the detecting one or more biometric image signals and one or more raw acoustic signals can be constant without a prompt for an authentication request such that when an authentication request is made, the electronic device will already have biometric acoustic and image signals moments before the authentication request.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein but are to be accorded the full scope consistent with the language of the claims and to encompass all legal equivalents.

What is claimed is:

1. A computer-implemented method, the method comprising:
   detecting, at an electronic device, one or more biometric image signals of a user from an image sensing device;
   detecting, at the electronic device, one or more raw acoustic signals associated with the user from an acoustic sensing devices, wherein the acoustic sensing device comprises:
      a first audio transducer, including one or more speakers;
      a second audio transducer, including one or more microphones; and
      one or more motion sensors for sensing motion including a gyroscope,
   accelerometer, IMU, or a combination thereof;
   wherein the raw acoustic signals are detected by an output audio signal via the one or more speakers and receiving an input audio signal based on a reflection of output audio signal on the user via the one or more microphones;

identifying one or more biometric acoustic signals derived from the one or more raw acoustic signals;

generating a biometric signal input of the one or more biometric acoustic signals and one or more biometric image signals;

applying a machine learning model to conduct feature extraction of the biometric signal input having one or more biometric acoustic signals and one or more biometric image signals;

generating a biometric user signature of the user from the machine learning model;

performing a privacy preserving hashing function to the biometric user signature to generate a hashed biometric user signature;

determining whether the hashed biometric user signature satisfies a predetermined probabilistic threshold with an enrollment hashed signature of the user; and authenticating an identity of the user upon detecting that the hashed biometric user signature satisfies the predetermined probabilistic threshold.

2. The computer implemented method of claim 1, wherein the biometric image signals include fingerprint pattern feature, facial features, iris features, or a combination thereof.

3. The computer implemented method of claim 1, wherein the first audio transducer transmits ultrasonic audio signals in the frequency range of 11-24 kHz.

4. The computer implemented method of claim 1, wherein the second audio transducer receives and captures ultrasonic audio signals at a sampling rate of 48 kHz.

5. The computer implemented method of claim 1, wherein the biometric acoustic signals include breathing patterns, breathing rate, heart rate, respiratory patterns, chest movement, chest expansion, body movement, facial movement, or a combination thereof.

6. The computer implemented method of claim 1, wherein the biometric acoustic signals include hand motion patterns, hand vibration patterns, or a combination thereof.

7. The computer implemented method of claim 1, wherein identifying the one or more biometric acoustic signals comprises generating one or more sonar heat maps of the raw acoustic signals from one or more reflections of ultrasonic waves detected by the second audio transducer.

8. The computer implemented method of claim 1, wherein identifying the one or more biometric acoustic signals comprises applying a noise filter circuit or noise filter algorithm.

9. The computer implemented method of claim 7, wherein identifying the one or more biometric acoustic signals is performed by a cross modal learning model configured to predict and determine whether the one or more raw acoustic signals detected by the electronic device are biometric acoustic signals.

10. The computer implemented method of claim 9, further comprising:

generating a teacher network configured to receive biometric wearable signals;

generating a student network configured to receive the one or more sonar heat maps of the raw acoustic signals, motion patterns from the one or more motion sensors, or a combination thereof;

receiving, at the student network, supervised training by the teacher network; and predicting, based on the one or more sonar heat maps and supervised training by the teacher network whether the one or more sonar heat maps of the raw acoustic signals are biometric acoustic signals.

11. The computer implemented method of claim 10, wherein the biometric wearable signals are generated by one or more sensing wearables having a respiration force sensor, a gyroscope, an accelerometer, or a combination thereof configured to detect raw wearable signals.

12. The computer implemented method of claim 10, wherein each of the teacher network and student network are neural networks.

13. The computer implemented method of claim 1, wherein the biometric signal input is a k×n matrix.

14. The computer implemented method of claim 1, wherein the machine learning model is a transfer learning model having pretrained training data associated with biometric acoustic training features and biometric image training features.

15. The computer implemented method of claim 1, further comprising generating an m-dimensional feature vector comprising the one or more biometric acoustic signals from the input table.

16. The computer implemented method of claim 15, further comprising generating a plurality of m-dimensional feature vectors wherein each of the plurality of m-dimensional feature vectors is associated with a biometric acoustic signal of the one or more biometric acoustic signals.

17. The computer implemented method of claim 15, wherein the m-dimensional feature vector includes a 128-2048 dimension embedding.

18. The computer implemented method of claim 1, wherein the hashing function is a locality sensitive hashing function to generate locality sensitive hashes.

19. The computer implemented method of claim 1, further comprising associating, when the predetermined probabilistic threshold is satisfied, the hashed biometric user signature with a same bucket as that of the enrollment hashed signature, and when the predetermined probabilistic threshold is not satisfied, the hashed biometric user signature with a different bucket as that of the enrollment hashed signature.

20. The computer implemented method of claim 19, wherein the predetermined probabilistic threshold is 80% similarity.

21. The computer implemented method of claim 19, further comprising authenticating an identity of the user when detecting the hashed biometric user signature was placed in the same bucket as that of the enrollment hashed signature.

22. The computer implemented method of claim 1, wherein the image sensing device includes an iris scanner, a fingerprint scanner, a camera, a depth sensing camera, or a combination thereof.

23. The computer implemented method of claim 1, wherein the electronic device is a mobile device, laptop, desktop computer, wearable device, automobile, smoke detector, home security system, or an IoT smart assistant.

24. The computer implemented method of claim 5, wherein chest movement is detected by the user's breathing pattern, heartbeats, abdomen movements, vibrations in limbs, or a combination thereof.

25. The computer implemented method of claim 1 wherein the detecting of the one or more biometric image signals and one or more raw acoustic signals is activated in response to an authentication request by the user.

26. The computer implemented method of claim 1 wherein the detecting of the one or more biometric image signals and one or more raw acoustic signals is activated independently of the user's motion or request for authentication.

27. A method of generating an anonymized user signature, the method comprising:

detecting, at an electronic device, one or more biometric acoustic signals;

generating a biometric signal input of the one or more biometric acoustic signals;

applying a machine learning model to conduct feature extraction of the biometric signal input having one or more biometric acoustic signals;

generating a biometric user signature of the user from the machine learning model;

performing one or more privacy preserving hashing functions to the biometric user signature to generate a hashed biometric user signature;

determining, whether the hashed biometric user signature satisfies a predetermined threshold with an enrollment hashed signature of the user;

associating, when the predetermined threshold is satisfied, the hashed biometric user signature with a same bucket as that of the enrollment hashed signature, and when the predetermined threshold is not satisfied, the hashed biometric user signature with a different bucket as that of the enrollment hashed signature; and authenticating an identity of the user upon detecting that the hashed biometric user signature was placed in the same bucket as that of the enrollment hashed signature.

* * * * *